(12) United States Patent
Zhang et al.

(10) Patent No.: US 10,484,997 B2
(45) Date of Patent: Nov. 19, 2019

(54) COMMUNICATION METHOD, BASE STATION AND USER EQUIPMENT

(71) Applicant: Huawei Technologies Co., Ltd., Shenzhen (CN)

(72) Inventors: Jian Zhang, Shanghai (CN); Qinghai Zeng, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 14/951,091

(22) Filed: Nov. 24, 2015

(65) Prior Publication Data

US 2016/0081076 A1    Mar. 17, 2016

Related U.S. Application Data

(63) Continuation of application No. PCT/CN2013/076577, filed on May 31, 2013.

(51) Int. Cl.
*H04W 72/04* (2009.01)
*H04B 7/026* (2017.01)
*H04L 5/00* (2006.01)

(52) U.S. Cl.
CPC .......... *H04W 72/048* (2013.01); *H04B 7/026* (2013.01); *H04L 5/001* (2013.01);
(Continued)

(58) Field of Classification Search
CPC ................................................ H04W 72/048
See application file for complete search history.

(56) References Cited

U.S. PATENT DOCUMENTS

| | | | |
|---|---|---|---|
| 8,462,688 B1 * | 6/2013 | Dinan ................ | H04W 74/006 370/312 |
| 8,767,571 B2 * | 7/2014 | Faurie .................... | H04W 8/24 370/252 |

(Continued)

FOREIGN PATENT DOCUMENTS

| | | |
|---|---|---|
| CN | 102387508 A | 3/2012 |
| CN | 103052116 A | 4/2013 |

(Continued)

OTHER PUBLICATIONS

"Considerations on UE L3 data transfer capability," 3GPP TSG-RAN WG2 Meeting #67, Shenzhen, China, R2-094913, 3rd Generation Partnership Project, Valbonne, France (Aug. 24-28, 2009).

(Continued)

*Primary Examiner* — Andrew Lai
*Assistant Examiner* — Andrew C Lee
(74) *Attorney, Agent, or Firm* — Leydig, Voit & Mayer, Ltd.

(57) ABSTRACT

The present invention provides a communication method to solve a problem of a failure in data receiving that arises. The method includes: sending, by a first base station, first data to UE according to first data allocation information that is determined according to a radio access capability of the UE; and sending, by a second base station according to second data allocation information that is determined by the first base station according to the radio access capability of the UE, second data to the UE; where the first base station performs carrier aggregation with the second base station, and a total amount of data that is sent by the first base station and the second base station to the UE in a same TTI does not exceed a total amount of data that can be received according to the radio access capability of the UE.

12 Claims, 10 Drawing Sheets

(52) U.S. Cl.
CPC .......... *H04L 5/0023* (2013.01); *H04L 5/0035* (2013.01); *H04W 72/042* (2013.01); *H04W 72/0446* (2013.01)

(56) References Cited

U.S. PATENT DOCUMENTS

| | | | | |
|---|---|---|---|---|
| 8,792,436 | B2* | 7/2014 | Lee | H04B 7/0417 370/329 |
| 8,855,040 | B1* | 10/2014 | Gossett | H04J 11/005 370/315 |
| 8,879,497 | B2* | 11/2014 | Oizumi | H04W 72/12 370/329 |
| 8,942,192 | B2* | 1/2015 | Damnjanovic | H04W 72/04 370/329 |
| 9,072,104 | B2* | 6/2015 | Maeda | H04W 4/08 |
| 9,077,433 | B2* | 7/2015 | Yamada | H04B 1/7143 |
| 9,106,378 | B2* | 8/2015 | Luo | H04L 5/0007 |
| 9,119,071 | B2* | 8/2015 | Dimou | H04W 16/08 |
| 9,137,844 | B2* | 9/2015 | Kitazoe | H04W 76/27 |
| 9,173,198 | B2* | 10/2015 | Faurie | H04W 72/04 |
| 9,173,200 | B2* | 10/2015 | Schmidt | H04W 72/04 |
| 9,332,505 | B2* | 5/2016 | Siomina | H04W 52/18 |
| 9,374,767 | B2* | 6/2016 | Bienas | H04W 48/08 |
| 9,386,594 | B2* | 7/2016 | Liu | H04W 72/10 |
| 9,398,610 | B2* | 7/2016 | Aoyagi | H04W 74/002 |
| 9,491,670 | B2* | 11/2016 | Takano | H04W 36/0072 |
| 9,642,026 | B2* | 5/2017 | Ericson | H04W 24/08 |
| 9,713,056 | B2* | 7/2017 | Elsherif | H04W 36/22 |
| 9,954,587 | B2* | 4/2018 | Zhu | H04W 52/0209 |
| 2004/0009770 | A1* | 1/2004 | Sivanandan | H04W 28/18 455/425 |
| 2005/0215255 | A1* | 9/2005 | Tanoue | H04W 36/18 455/436 |
| 2007/0153687 | A1* | 7/2007 | Attar | H04L 1/20 370/229 |
| 2009/0274109 | A1* | 11/2009 | Zhang | H04L 1/1614 370/329 |
| 2009/0323638 | A1* | 12/2009 | Catovic | H04W 36/00837 370/331 |
| 2010/0098008 | A1* | 4/2010 | Ishii | H04W 72/06 370/329 |
| 2010/0105390 | A1* | 4/2010 | Ishii | H04W 72/0406 455/436 |
| 2010/0113024 | A1* | 5/2010 | Wu | H04W 36/14 455/436 |
| 2010/0113082 | A1* | 5/2010 | Ishii | H04W 72/0406 455/509 |
| 2010/0120435 | A1* | 5/2010 | Mia | H04W 64/003 455/440 |
| 2010/0135208 | A1* | 6/2010 | Ishii | H04W 76/10 370/328 |
| 2010/0173637 | A1* | 7/2010 | Damnjanovic | H04L 5/0007 455/447 |
| 2010/0190447 | A1* | 7/2010 | Agrawal | H04W 48/08 455/63.1 |
| 2010/0215032 | A1* | 8/2010 | Jalloul | H04L 27/2655 370/350 |
| 2010/0234029 | A1* | 9/2010 | Ishii | H04W 36/0066 455/437 |
| 2011/0151913 | A1* | 6/2011 | Forster | H04W 4/20 455/509 |
| 2011/0171952 | A1* | 7/2011 | Niu | H04L 43/0882 455/422.1 |
| 2011/0199921 | A1* | 8/2011 | Damnjanovic | H04W 52/367 370/252 |
| 2011/0237202 | A1* | 9/2011 | Uemura | H04W 36/0088 455/67.14 |
| 2011/0255486 | A1* | 10/2011 | Luo | H04W 48/12 370/329 |
| 2011/0267978 | A1* | 11/2011 | Etemad | H04L 5/003 370/254 |
| 2011/0274043 | A1* | 11/2011 | Nam | H04L 5/001 370/328 |
| 2011/0319069 | A1* | 12/2011 | Li | H04W 8/22 455/422.1 |
| 2012/0040687 | A1* | 2/2012 | Siomina | G01S 5/0205 455/456.1 |
| 2012/0087254 | A1* | 4/2012 | Yin | H04L 1/0031 370/252 |
| 2012/0120817 | A1* | 5/2012 | Khoshnevis | H04L 1/0026 370/252 |
| 2012/0127878 | A1* | 5/2012 | Kim | H04W 74/002 370/252 |
| 2012/0129517 | A1* | 5/2012 | Fox | H04L 41/5025 455/425 |
| 2012/0163185 | A1* | 6/2012 | Zhang | H04W 72/085 370/241 |
| 2012/0163301 | A1* | 6/2012 | Jang | H04W 48/18 370/328 |
| 2012/0184206 | A1* | 7/2012 | Kim | H04L 5/0091 455/9 |
| 2012/0220327 | A1* | 8/2012 | Lee | H04W 72/1273 455/509 |
| 2012/0243450 | A1* | 9/2012 | Ishii | H04L 5/0091 370/281 |
| 2012/0257568 | A1* | 10/2012 | Cai | H04L 1/1614 370/328 |
| 2012/0257588 | A1* | 10/2012 | Umeda | H04L 5/001 370/329 |
| 2012/0275369 | A1* | 11/2012 | Zhang | H04L 12/1881 370/312 |
| 2012/0307648 | A1* | 12/2012 | Okubo | H04W 72/06 370/241 |
| 2012/0329464 | A1* | 12/2012 | Tanaka | H04W 72/0426 455/438 |
| 2013/0010716 | A1* | 1/2013 | Dinan | H04W 76/15 370/329 |
| 2013/0028228 | A1* | 1/2013 | Nakayama | H04W 16/04 370/329 |
| 2013/0039203 | A1* | 2/2013 | Fong | H04B 7/024 370/252 |
| 2013/0058234 | A1* | 3/2013 | Yang | H04L 27/261 370/252 |
| 2013/0063753 | A1* | 3/2013 | Mitsui | G06F 3/1204 358/1.13 |
| 2013/0064165 | A1* | 3/2013 | Chen | H04W 56/0045 370/312 |
| 2013/0064226 | A1* | 3/2013 | Dinan | H04W 36/30 370/332 |
| 2013/0078913 | A1* | 3/2013 | Lee | H04L 5/0007 455/39 |
| 2013/0095816 | A1 | 4/2013 | Gerstenberger et al. | |
| 2013/0114577 | A1* | 5/2013 | Cai | H04L 5/0053 370/336 |
| 2013/0121216 | A1* | 5/2013 | Chen | H04L 1/1835 370/280 |
| 2013/0143502 | A1* | 6/2013 | Kazmi | H04W 88/06 455/62 |
| 2013/0155975 | A1* | 6/2013 | Dinan | H04B 7/0456 370/329 |
| 2013/0176981 | A1* | 7/2013 | Earnshaw | H04L 1/02 370/329 |
| 2013/0188510 | A1* | 7/2013 | Siomina | H04W 24/10 370/252 |
| 2013/0188582 | A1* | 7/2013 | Dinan | H04W 52/281 370/329 |
| 2013/0188620 | A1* | 7/2013 | Dinan | H04W 56/0005 370/336 |
| 2013/0210447 | A1* | 8/2013 | Moe | H04W 28/16 455/453 |
| 2013/0217402 | A1* | 8/2013 | Lin | H04W 72/12 455/450 |
| 2013/0242821 | A1* | 9/2013 | Wei | H04B 7/2615 370/280 |
| 2013/0250925 | A1* | 9/2013 | Lohr | H04W 72/0446 370/336 |
| 2013/0286952 | A1* | 10/2013 | Ghosh | H04L 5/0007 370/329 |

(56) References Cited

U.S. PATENT DOCUMENTS

| | | | | |
|---|---|---|---|---|
| 2013/0294414 | A1* | 11/2013 | Inumaru | H04L 5/001 370/331 |
| 2013/0322363 | A1* | 12/2013 | Chen | H04W 72/042 370/329 |
| 2014/0050191 | A1* | 2/2014 | Kim | H04L 5/001 370/329 |
| 2014/0153534 | A1* | 6/2014 | Kim | H04W 52/146 370/329 |
| 2014/0160976 | A1* | 6/2014 | Dimou | H04W 76/02 370/252 |
| 2014/0162642 | A1* | 6/2014 | Kwon | H04W 8/24 455/435.1 |
| 2014/0254537 | A1* | 9/2014 | Kim | H04W 52/243 370/329 |
| 2014/0269627 | A1* | 9/2014 | Gorokhov | H04W 72/0446 370/336 |
| 2014/0286219 | A1* | 9/2014 | Siomina | H04J 11/0023 370/311 |
| 2014/0321422 | A1* | 10/2014 | Choi | H04L 1/1861 370/330 |
| 2015/0003407 | A1* | 1/2015 | Seo | H04L 25/0224 370/330 |
| 2015/0071099 | A1* | 3/2015 | Yi | H04B 7/2656 370/252 |
| 2015/0117352 | A1* | 4/2015 | Nammi | H04L 12/00 370/329 |
| 2016/0309426 | A1 | 10/2016 | Zhang et al. | |

FOREIGN PATENT DOCUMENTS

| | | |
|---|---|---|
| EP | 2753035 A2 | 7/2014 |
| EP | 2775758 A1 | 9/2014 |
| JP | 2011228806 A | 11/2011 |
| RU | 2011127204 A | 1/2013 |
| WO | WO 2008041928 A1 | 4/2008 |
| WO | WO 2009024501 A1 | 2/2009 |
| WO | WO 2013053339 A2 | 4/2013 |

OTHER PUBLICATIONS

"$3^{rd}$ Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.3.0, pp. 1-27, $3^{rd}$ Generation Partnership Project, Valbonne, France (Mar. 2013).

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.5.0, pp. 1-209, $3^{rd}$ Generation Partnership Project, France (Mar. 2013).

"$3^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.3.0, pp. 1-344, $3^{rd}$ Generation Partnership Project, Valbonne, France (Mar. 2013).

"Soft Buffer Allocation for CA," 3GPP TSG RAN WG1 Meeting #64, Taipei, Taiwan, R1-110860, $3^{rd}$ Generation Partnership Project, Valbonne, France (Feb. 21-25, 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.4.0, pp. 1-101, 3rd Generation Partnership Project, Valbonne, France (Dec. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.4.0, pp. 1-125, 3rd Generation Partnership Project, Valbonne, France (Dec. 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300, V10.6.0, pp. 1-194, 3rd Generation Partnership Project, Valbonne, France (Dec. 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.12.0, pp. 1-149, 3rd Generation Partnership Project, Valbonne, France (Mar. 2010).

* cited by examiner

COMMUNICATION METHOD, BASE STATION AND USER EQUIPMENT

CROSS-REFERENCE TO RELATED APPLICATIONS

This application is a continuation of International Patent Application No. PCT/CN2013/076577, filed on May 31, 2013, which is hereby incorporated by reference in its entirety.

TECHNICAL FIELD

The present invention relates to the field of communications technologies, and in particular, to a communication method, a base station and user equipment.

BACKGROUND

With rapid development of communications technologies, wireless communications technologies have been widely applied due to their advantages of convenience and efficiency in information transmission and low costs. However, as demands for spectrum resources in wireless communications systems continuously increase, spectrum resources for the wireless communications systems are decreasing gradually. As a type of non-renewable resource, a spectrum resource cannot be occupied simultaneously by another communications system once it is occupied by a communications system. To improve system bandwidth and solve a conflict between spectrum resources in communications systems and growing wireless communications demands, the 3rd Generation Partnership Project (The 3rd Generation Partnership Project, 3GPP) Long Term Evolution Advanced (Long Term Evolution Advanced, LTE-A) provides a technology of spectrum aggregation, that is, carrier aggregation (Carrier Aggregation, CA).

By using the carrier aggregation technology, multiple contiguous or non-contiguous component carriers (Component Carrier, CC) can be aggregated to obtain higher bandwidth, thereby increasing a peak data rate and a system throughput. In a communications system, after carrier aggregation is configured, user equipment (User Equipment, UE) may establish network communication by using multiple serving cells (Serving Cell) within a management area of one or more base stations (Base Station, BS). Frequencies of carrier components corresponding to different serving cells are usually different.

At present, in a process of configuring carrier aggregation, component carriers may be provided by a same base station, or may be provided by different base stations; the former is referred to as intra-base station carrier aggregation (Intra-BS CA), and the latter is referred to as inter-base station carrier aggregation (Inter-BS CA).

For the intra-base station carrier aggregation, in an LTE-A system, multiple co-site component carriers are provided by a base station, or multiple non-co-site component carriers are separately provided by a base station and a remote radio head (Remote Radio Head, RRH) of the base station. The base station configures, according to specific wireless conditions (such as channel quality, and pilot signal strength) and service conditions, carrier aggregation for UE that is located in a common coverage area of the foregoing multiple component carriers.

For the inter-base station carrier aggregation, UE may establish a radio connection relationship with one or more base stations that participate in carrier aggregation configuration, that is, establish network communication with multiple serving cells within a management area of the one or more base stations. In a process of configuring the inter-base station carrier aggregation, one base station (which is referred to as a first base station in the following) is responsible for data splitting/convergence usually. The first base station sends part of downlink data, such as a Packet Data Convergence Protocol (Packet Data Convergence Protocol, PDCP) protocol data unit (Protocol Data Unit, PDU) and a Radio Link Control (Radio Link Control, RLC) PDU, to one or more other base stations (which are referred to as second base stations in the following). As can be seen that, in the inter-base station carrier aggregation, the UE may receive downlink data by using radio links of multiple base stations, and send uplink data by using the radio links of the multiple base stations, and all the uplink data of the UE received by at least one of the foregoing second base stations is sent to the first base station that is responsible for data splitting/convergence. Referring to FIG. 1, FIG. 1 is a schematic diagram of inter-base station carrier aggregation in an LTE system. A first base station eNB1 and a second base station eNB2 separately schedule UE independently.

In a wireless communications system, after UE establishes a radio resource control (Radio Resource Control, RRC) connection with a base station, the base station schedules the UE. In the inter-base station carrier aggregation, multiple base stations that participate in carrier aggregation separately schedule UE independently. In a case in which a backhaul link (backhaul) is not in a desirable condition, referring to FIG. 1, the first base station eNB1 sends a first transport block TB1 to the UE, the second base station eNB2 sends a second transport block TB2 to the UE, and a total number of bits corresponding to the first transport block TB1 and the second transport block TB2 exceeds a bearer capability of the UE, causing that the UE fails to receive one of the transport blocks or fails to receive both transport blocks.

As can be seen that, during the inter-base station carrier aggregation, when multiple base stations send an excessively large amount of data to UE, the UE needs to discard some or all to-be-received data, causing a data receiving error.

SUMMARY

Embodiments of the present invention provide a communication method, a base station and user equipment, to solve a problem of a failure in data receiving that arises when multiple base stations schedule UE independently in a process of inter-base station carrier aggregation.

According to a first aspect, a communication method is provided, including:

sending, by a first base station, first data to user equipment UE according to first data allocation information that is determined according to a radio access capability of the UE; and instructing, by the first base station, a second base station to send, according to second data allocation information that is determined according to the radio access capability of the UE, second data to the UE, where the second base station performs carrier aggregation with the first base station;

where a total amount of the first data sent by the first base station and the second data sent by the second base station to the UE in a same transmission time interval TTI does not exceed a total amount of data that can be received by the UE according to the radio access capability of the UE.

With reference to the first aspect, in a first possible implementation manner, the first data allocation information includes a data allocation threshold for sending the first data to the UE by the first base station, and/or data allocation timing information for sending the first data to the UE by the first base station; and the second data allocation information includes a data allocation threshold for sending the second data to the UE by the second base station, and/or data allocation timing information for sending the second data to the UE by the second base station.

With reference to the first possible implementation manner of the first aspect, in a second possible implementation manner, when the data allocation information includes the data allocation threshold, the data allocation threshold includes at least any one of the following parameters: a maximum number of downlink shared channel DL-SCH transport block bits received within a TTI; a maximum number of bits of a DL-SCH transport block received within a TTI; a total number of soft channel bits; a maximum number of supported layers for spatial multiplexing in downlink; and a maximum number of downlink Packet Data Convergence Protocol PDCP service data units SDUs within a TTI.

With reference to the first possible implementation manner of the first aspect, in a third possible implementation manner, when the data allocation information includes the data allocation timing information, the data allocation timing information includes subframe information, where the first base station or the second base station sends data to the UE according to the subframe information.

With reference to the third possible implementation manner of the first aspect, in a fourth possible implementation manner, the first base station sends a subframe bitmap to the UE, where the subframe bitmap includes a subframe number occupied when the first base station sends the first data to the UE and a subframe number occupied when the second base station sends the second data to the UE.

With reference to the third possible implementation manner of the first aspect, in a fifth possible implementation manner, the first base station instructs the second base station to send data to the UE in a corresponding subframe.

With reference to the first possible implementation manner of the first aspect, or the fifth possible implementation manner of the first aspect, in a sixth possible implementation manner, the data allocation threshold includes a Multiple Input Multiple Output MIMO mode used by the first base station or the second base station to send data to the UE, where the MIMO mode is a maximum number of supported layers for spatial multiplexing in downlink.

With reference to the first to the sixth possible implementation manners of the first aspect, in a seventh possible implementation manner, the first base station receives a signal quality parameter and identification information corresponding to the UE that are sent by the UE; the first base station obtains a radio access capability parameter of the UE according to the identification information corresponding to the UE; and according to the signal quality parameter and the radio access capability parameter of the UE, the first base station determines the first data allocation information, and determines the second data allocation information of the second base station.

With reference to the first to the sixth possible implementation manners of the first aspect, in an eighth possible implementation manner, the first base station determines the first data allocation information and the second data allocation information according to a preset period; or the first base station determines the first data allocation information and the second data allocation information according to a measurement report or quality of service QoS reported by the UE.

With reference to the eighth possible implementation manner of the first aspect, in a ninth possible implementation manner, the first base station sends the measurement report to the second base station, and instructs the second base station to update, according to the measurement report, the second data allocation information; and the first base station receives updated second data allocation information sent by the second base station.

With reference to the first aspect, in a tenth possible implementation manner, the first data allocation information and the second data allocation information each further include a data allocation effective time; the sending, by a first base station, first data to UE according to first data allocation information that is determined according to a radio access capability of the UE specifically includes: sending, by the first base station, the first data to the UE according to the first data allocation information at a moment corresponding to the data allocation effective time included in the first data allocation information; and the instructing, by the first base station, a second base station to send, according to second data allocation information that is determined according to the radio access capability of the UE, second data to the UE specifically includes: instructing, by the first base station, the second base station to send, according to the second data allocation information at a moment corresponding to the data allocation effective time included in the second data allocation information, the second data to the UE.

With reference to the first to the tenth possible implementation manners of the first aspect, in an eleventh possible implementation manner, the first base station receives hybrid automatic repeat request HARQ feedback information or a Radio Link Control RLC status report sent by the UE, and adjusts, according to the HARQ feedback information or the RLC status report, a rate for sending data to the UE.

According to a second aspect, a communication method is provided, including:

receiving, by a second base station, data allocation information that is determined by a first base station according to a radio access capability of user equipment UE; and sending, by the second base station, data to the UE according to the data allocation information;

where the first base station performs carrier aggregation with the second base station, and a total amount of data sent by the first base station and the second base station to the UE in a same transmission time interval TTI does not exceed a total amount of data that can be received by the UE according to the radio access capability of the UE.

With reference to the second aspect, in a first possible implementation manner, the second base station sends, according to a data allocation effective time included in the data allocation information, the data to the UE at a moment corresponding to the data allocation effective time.

With reference to the second aspect, in a second possible implementation manner, the data allocation information includes: a data allocation threshold for sending data to the UE by the second base station, and/or data allocation timing information for sending data to the UE by the second base station.

With reference to the second possible implementation manner of the second aspect, in a third possible implementation manner, when the data allocation information includes the data allocation timing information, the data allocation timing information includes subframe information, where the second base station sends data to the UE according to the subframe information.

With reference to the third possible implementation manner of the second aspect, in a fourth possible implementation manner, when the subframe information includes a subframe bitmap, the method further includes: sending, by the second base station, the subframe bitmap to the UE, where the subframe bitmap includes a subframe number occupied when the first base station sends data to the UE and a subframe number occupied when the second base station sends data to the UE.

With reference to the second possible implementation manner of the second aspect, or the third possible implementation manner of the second aspect, in a fifth possible implementation manner, when the data allocation information includes the data allocation threshold, the data allocation threshold includes a Multiple Input Multiple Output MIMO mode used by the second base station to send data to the UE, where the MIMO mode is a maximum number of supported layers for spatial multiplexing in downlink.

With reference to the first to the fifth possible implementation manners of the second aspect, in a sixth possible implementation manner, the second base station sends, according to a measurement report reported by the UE, updated data allocation information to the first base station.

With reference to the first to the sixth possible implementation manners of the second aspect, in a seventh possible implementation manner, the second base station receives hybrid automatic repeat request HARQ feedback information or a Radio Link Control RLC status report sent by the UE, and adjusts, according to the HARQ feedback information or the RLC status report, a rate for sending data to the UE.

According to a third aspect, a communication method is provided, including:

receiving, by user equipment UE, first data that is sent by a first base station according to first data allocation information; and receiving, by the UE, second data that is sent by a second base station according to second data allocation information;

where the first data allocation information and the second data allocation information are determined by the first base station according to a radio receiving capability of the UE, and a total amount of the first data sent by the first base station and the second data sent by the second base station that are received by the UE in a same transmission time interval TTI does not exceed a total amount of data that can be received by the UE according to the radio access capability of the UE.

With reference to the third aspect, in a first possible implementation manner, the first data allocation information includes a data allocation threshold for sending the first data to the UE by the first base station, and/or data allocation timing information for sending the first data to the UE by the first base station; and the second data allocation information includes a data allocation threshold for sending the second data to the UE by the second base station, and/or data allocation timing information for sending the second data to the UE by the second base station.

With reference to the first possible implementation manner of the third aspect, in a second possible implementation manner, when the data allocation information includes the data allocation timing information, the data allocation timing information includes subframe information, where the first base station or the second base station sends data to the UE according to the subframe information.

With reference to the second possible implementation manner of the third aspect, in a third possible implementation manner, the UE receives a subframe bitmap sent by the first base station and/or the second base station, where the subframe bitmap includes a subframe number occupied when the first base station sends the first data to the UE and a subframe number occupied when the second base station sends the second data to the UE; and the UE receives, according to the subframe bitmap, in a subframe corresponding to the subframe number occupied when the first base station sends the first data to the UE, the first data sent by the first base station, and receives, in a subframe corresponding to the subframe number occupied when the second base station sends the second data to the UE, the second data sent by the second base station.

With reference to the first to the third possible implementation manners of the third aspect, in a fourth possible implementation manner, the UE obtains a first data sending rate corresponding to the first base station and a second data sending rate corresponding to the second base station, and when the UE determines that an absolute value of a difference between the first data sending rate and the second data sending rate is greater than a preset threshold, notifies the first base station or the second base station to adjust a data sending rate.

According to a fourth aspect, a base station is provided, including:

a sending unit, configured to send first data to user equipment UE according to first data allocation information that is determined according to a radio access capability of the UE; and an instructing unit, configured to instruct a carrier aggregation base station to send, according to second data allocation information that is determined according to the radio access capability of the UE, second data to the UE, where the carrier aggregation base station performs carrier aggregation with the base station; where a total amount of the first data sent by the base station and the second data sent by the carrier aggregation base station to the UE in a same transmission time interval TTI does not exceed a total amount of data that can be received by the UE according to the radio access capability of the UE.

According to a fifth aspect, a base station is provided, including:

a receiving unit, configured to receive data allocation information that is determined by a first base station according to a radio access capability of user equipment UE, and send the data allocation information to a data sending unit; and the sending unit, configured to receive the data allocation information sent by the receiving unit, and send data to the UE according to the data allocation information; where the first base station performs carrier aggregation with the base station, and a total amount of data sent by the base stations to the UE in a same transmission time interval TTI does not exceed a total amount of data that can be received by the UE according to the radio access capability of the UE.

According to a sixth aspect, user equipment is provided, including:

a data receiving unit, configured to receive first data that is sent by a first base station according to first data allocation information, where the data receiving unit is further configured to receive second data that is sent by a second base station according to second data allocation information; where the first data allocation information and the second data allocation information are determined by the first base station according to a radio receiving capability of the UE, and a total amount of the first data sent by the first base station and the second data sent by the second base station that are received by the UE in a same transmission time interval TTI does not exceed a total amount of data that can be received by the UE according to the radio access capability of the UE.

In the embodiments of the present invention, a first base station sends first data to UE according to first data allocation information that is determined according to a radio access capability of the UE; and a second base station sends second data to the UE according to second data allocation information that is determined by the first base station according to the radio access capability of the UE; where the first base station performs carrier aggregation with the second base station, and a total amount of data that is sent by the first base station and the second base station to the UE in a same TTI does not exceed a total amount of data that can be received according to the radio access capability of the UE. By using the technical solutions of the present invention, multiple base stations that participate in carrier aggregation can be coordinated to allocate downlink resources to UE, so that an amount of data sent to the UE satisfies a radio access capability of the UE, thereby ensuring correctness of data receiving by the UE.

DESCRIPTION OF EMBODIMENTS

Figure 1:
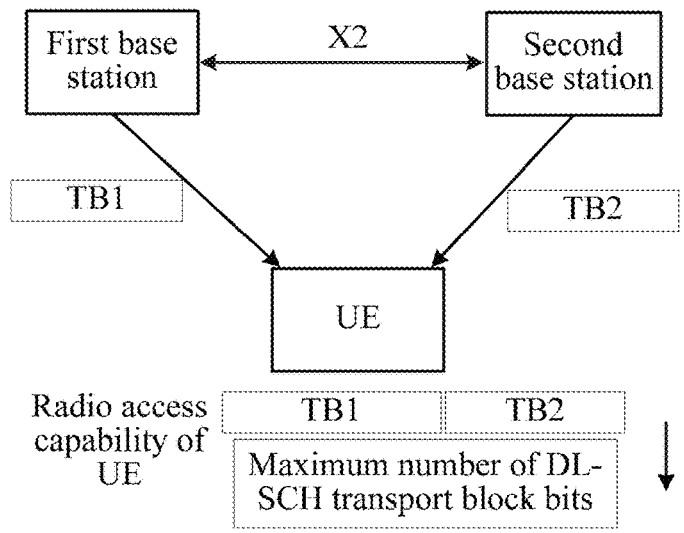
FIG. 1 is a schematic diagram of information exchange when multiple base stations separately schedule UE independently in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (Advanced long term evolution, LTE-A) system, and a Universal Mobile Telecommunications System (Universal Mobile Telecommunication System, UMTS).

It should further be understood that in the embodiments of the present invention, user equipment (UE, User Equipment) includes but is not limited to a mobile station (MS, Mobile Station), a mobile terminal (Mobile Terminal), a mobile telephone (Mobile Telephone), a handset (handset), portable equipment (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communication function; the user equipment may further be a portable, pocket-sized, handheld, computer built-in, or in-vehicle mobile apparatus.

In the embodiments of the present invention, a base station (for example, an access point) may refer to a device in communication with a radio terminal via one or more sectors at an air interface in an access network. The base station may be configured to mutually convert a received over-the-air frame and an IP packet and serve as a router between the radio terminal and a rest portion of the access network, where the rest portion of the access network may include an Internet protocol (IP) network. The base station may also coordinate attribute management of the air interface. For example, the base station may be a base station (BTS, Base Transceiver Station) in the GSM or CDMA, may also be a base station (NodeB) in WCDMA, and may further be an evolved NodeB (NodeB, eNB, or e-NodeB, evolutional Node B) in the LTE, which is not limited in the present invention.

To solve a problem of a failure in data receiving that arises when multiple base stations schedule UE independently in inter-base station carrier aggregation, in the embodiments of the present invention, a first base station sends first data to UE according to first data allocation information that is determined according to a radio access capability of the UE; and a second base station sends second data to the UE according to second data allocation information that is determined by the first base station according to the radio access capability of the UE; where the first base station performs carrier aggregation with the second base station, and a total amount of data that is sent by the first base station and the second base station to the UE in a same TTI does not exceed a total amount of data that can be received according to the radio access capability of the UE. By using the technical solutions of the present invention, multiple base stations that participate in carrier aggregation can be coordinated to allocate downlink resources to UE, so that an amount of data sent to the UE satisfies a radio access capability of the UE, thereby ensuring correctness of data receiving by the UE.

Figure 2:
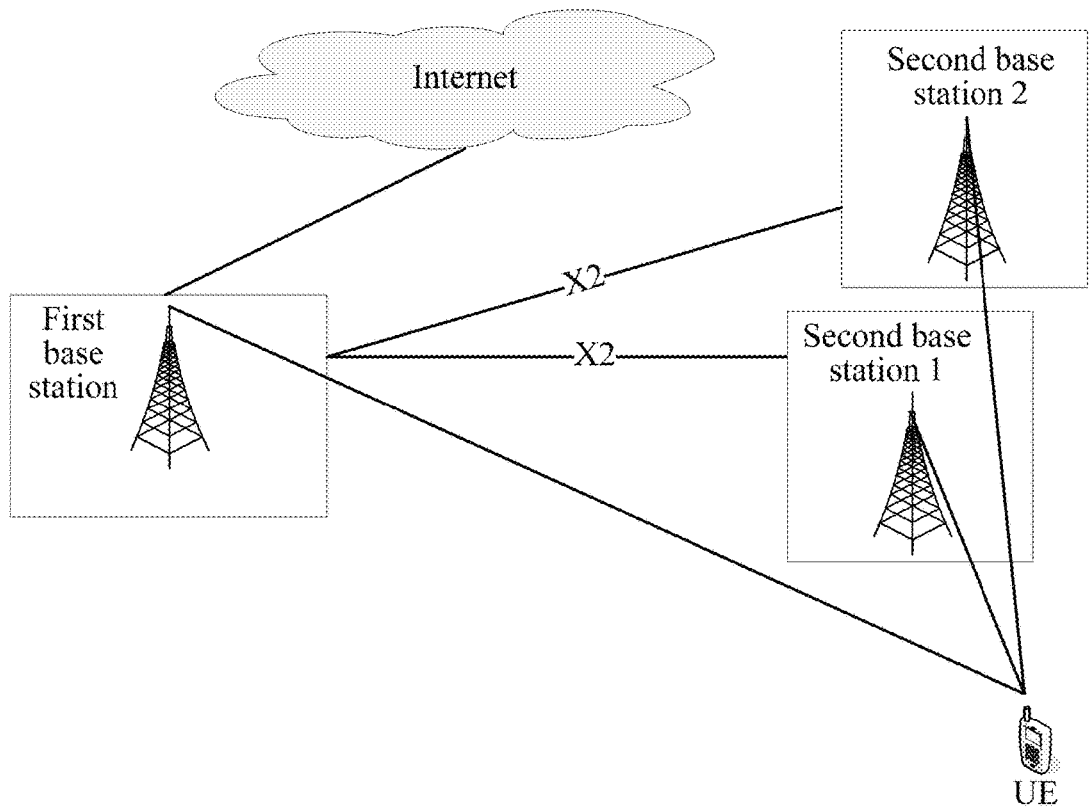
FIG. 2 is a system architectural diagram when multiple base stations schedule UE according to an embodiment of the present invention.

The technical solutions of the present invention are applicable to 3G and 4G networks. In the embodiments of the present invention, an LTE network is used as an example for detailed description. Refer to FIG. 2 for an architectural diagram of a network system of the LTE network, where a first base station is a base station responsible for data splitting/convergence, and the first base station, a second base station 1 and a second base station 2 participate in carrier aggregation, and allocate downlink resources to UE. The network system in the technical solutions of the present invention may include two base stations (that is, a first base station and a second base station), or may include at least three base stations (that is, a first base station and at least two second base stations). In the embodiments of the present invention, an example in which the network system includes two base stations is used for detailed description.

Exemplary embodiments of the present invention are described in detail in the following with reference to accompanying drawings.

Figure 3:
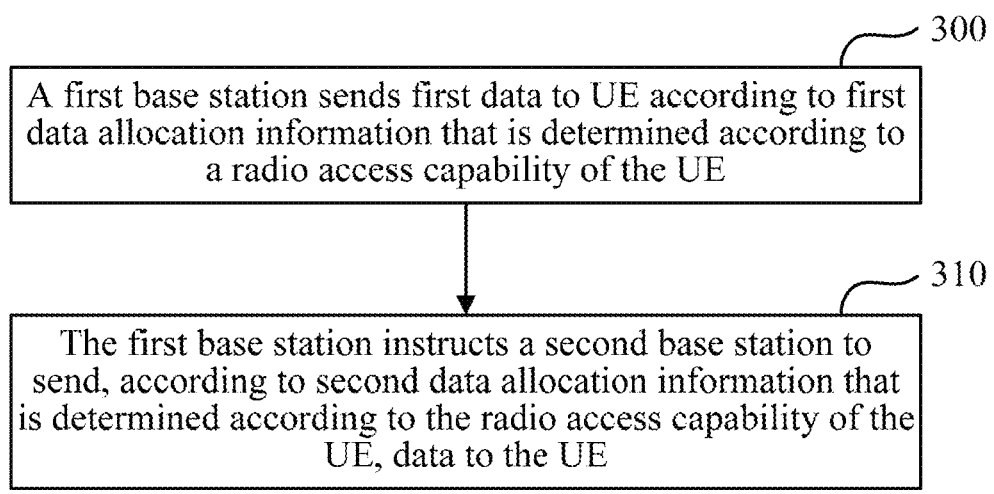
FIG. 3 is detailed flowchart 1 of a communication process when multiple base stations schedule UE separately according to an embodiment of the present invention.

Referring to FIG. 3, in an embodiment of the present invention, a detailed process of controlling, by a first base station, inter-base station carrier aggregation to perform data sending is as follows:

Step 300: A first base station sends first data to UE according to first data allocation information that is determined according to a radio access capability of the UE.

In this embodiment of the present invention, a total amount of data that is sent by the first base station and a second base station to the UE in a same TTI does not exceed a total amount of data that can be received according to the radio access capability of the UE. UEs of different categories have different radio access capabilities. In related standards, downlink physical layer parameter values (that is, radio access capabilities of UEs) for 8 categories of LTE UEs are specified, as shown in Table 1.

TABLE 1

Downlink physical layer UE-category parameter values

| UE category (UE Category) | Maximum number of downlink shared channel transport block bits received within a transmission time interval (Maximum number of DL-SCH transport block bits received within a TTI (Note)) | Maximum number of bits of a DL-SCH transport block received within a TTI (Maximum number of bits of a DL-SCH transport block received within a TTI) | Total number of soft channel bits (Total number of soft channel bits) | Maximum number of supported layers for spatial multiplexing in downlink (Maximum number of supported layers for spatial multiplexing in DL) |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

It can be known from Table 1 that the UE category (UE-category) defines a combination of a downlink capability and an uplink capability corresponding to each UE category. The parameter "Maximum number of downlink shared channel (Downlink Shared Channel, DL-SCH) transport block bits received within a transmission time interval (Transmission Time Interval, TTI) (Maximum number of DL-SCH transport Block bits Received within a TTI)" defines a maximum number of DL-SCH transport block bits that can be received by UE within a DL-SCH TTI, and represents a peak data rate supported by a UE category; the parameter "Maximum number of bits of a DL-SCH transport block received within a TTI (Maximum number of bits of a DL-SCH transport block received within a TTI)" defines a maximum number of DL-SCH transport block bits that can be received by UE in a transport block within a DL-SCH TTI; the parameter "Total number of soft channel bits (Total number of soft channel bits)" defines a number of soft channel bits available (available) for hybrid automatic repeat request (Hybrid Automatic Retransmission request, HARQ) processing; the parameter "Maximum number of supported layers for spatial multiplexing in downlink (Maximum number of supported layers for spatial multiplexing in DL)" defines a maximum number of supported layers for a spatial multiplexing operation in a downlink Multiple Input Multiple Output (Multiple Input Multiple Output, MIMO) antenna. In an LTE system, a length of a TTI is a length (1 ms) of a subframe (subframe).

In related standards, a maximum number of downlink PDCP service data units (service data unit, SDU) within a TTI is specified, as shown in FIG. 2.

TABLE 2

Maximum number of downlink PDCP SDUs within a TTI

| UE category (UE Category) | Maximum number of downlink PDCP service data units within a TTI (Maximum number of PDCP SDUs a TTI) |
|---|---|
| Category 1 | 10 |
| Category 2 | 10 |
| Category 3 | 20 |
| Category 4 | 30 |
| Category 5 | 50 |
| Category 6 | 50 |
| Category 7 | 50 |

All parameters in Table 1 and Table 2 are parameters that represent a radio access capability of UE.

In this embodiment of the present invention, a process of determining, by the first base station, the first data allocation information of the first base station and second data allocation information of the second base station is: receiving, by the first base station, a measurement report reported by the UE, and obtaining a signal quality parameter of a serving cell of at least one base station and identification information corresponding to the UE that are carried in the measurement report; and obtaining, by the first base station according to the signal quality parameter and the identification information corresponding to the UE, the first data allocation information of the first base station and the second data allocation information of the second base station, where the data allocation information includes a data allocation threshold and/or data allocation timing information. It can be known from the foregoing process that, the data allocation information is obtained according to the signal quality parameter, and the signal quality parameter is related to load, wireless conditions, data splitting algorithms and traffic control situations that are corresponding to serving cells within a management area of the first base station and a management area of the second base station; therefore, the first data allocation information and the second data allocation information vary with the load, wireless conditions, data splitting algorithms and traffic control situations that are corresponding to the serving cells within the management area of the first base station and the management area of the second base station.

In the foregoing process, a process of obtaining, by the first base station, the first data allocation information and the second data allocation information according to the signal quality parameter and the identification information corresponding to the UE is: obtaining, by the first base station, a radio access capability parameter of the UE according to the identification information corresponding to the UE; and according to the signal quality parameter and the radio access capability parameter of the UE, determining, by first base station, the first data allocation information of the first base station, and determining the second data allocation information of the second base station. In this embodiment of the present invention, the first data allocation information of the first base station and the second data allocation information of the second base station are obtained according to the signal quality parameter. When signal quality corresponding to a serving cell within a management area of a base station is better, a larger amount of data to be sent may be allocated to the base station, so that a base station with better signal quality carries a larger amount of data to be sent, which effectively increases a throughput of a system.

Optionally, the data allocation information may also include a data allocation effective time. The data allocation effective time is preset by the first base station, and the first base station sends the data allocation effective time to the second base station, so that the second base station processes, according to the data allocation effective time, a time at which the second base station sends data to the UE. The data allocation effective time may take a form of a time point, such as time stamp (time stamp) information, or may take a form of an absolute time information system frame number, such as an SFN (frame number).

In a process of configuring inter-base station carrier aggregation, the first base station may determine, according to a preset period, the first data allocation information for sending the first data to the UE, and determine the second data allocation information for sending second data to the UE by the second base station that performs carrier aggregation with the first base station; and the first base station may also obtain the first data allocation information and the second data allocation information when determining, according to a measurement report or quality of service (Quality of Service, QoS) reported by the UE, that the second data allocation information needs to be sent to the second base station. Specifically, when the first base station determines, according to the measurement report or QoS reported by the UE, that an amount of data simultaneously sent by the first base station and second base station to the UE is greater than a total amount of data that can be received according to the radio access capability of the UE, the first base station determines the first data allocation information for sending the first data to the UE, and determines the second data allocation information for sending the second data to the UE by the second base station.

Figure 4:
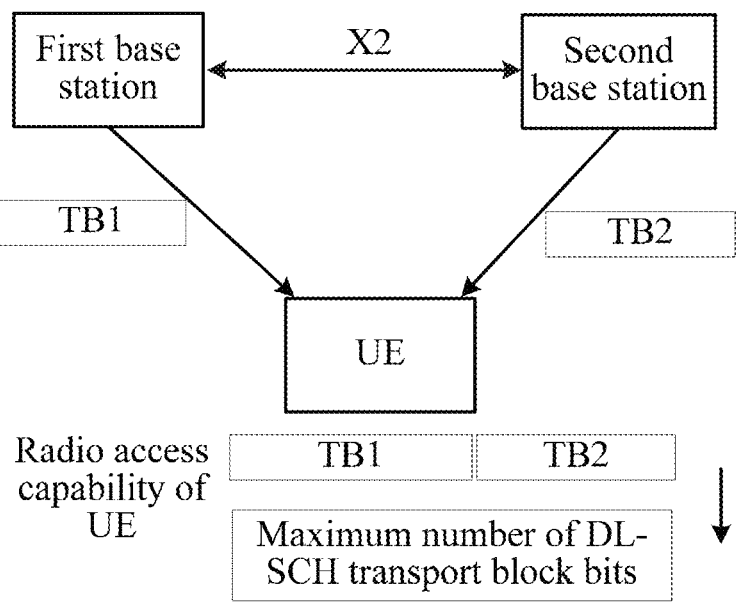
FIG. 4 is schematic diagram 1 of information exchange when multiple base stations separately schedule UE independently according to an embodiment of the present invention.

In this embodiment of the present invention, the data allocation threshold included in the data allocation information is obtained according to the radio access capability parameter of the UE corresponding to the UE. Specifically, the data allocation threshold includes one of or any combination of the following parameters: a maximum number of DL-SCH transport block bits received within a TTI, a maximum number of bits of a DL-SCH transport block received within a TTI, a total number of soft channel bits, a maximum number of supported layers for spatial multiplexing in downlink, and a maximum number of PDCP SDUs within a TTI. When the first base station sends the second data allocation information that includes the data allocation threshold to the second base station, the first base station and the second base station may send data of a preset amount to the UE according to the data allocation information. If the radio access capability parameter of the UE is TB, an amount of data sent by the first base station to the UE is TB1, an amount of data sent by the second base station to the UE is TB2, and TB1+TB2≤TB, a total amount of data within a TTI does not exceed a bearer capability of the UE when the first base station and second base station send the data simultaneously to the UE, as shown in FIG. 4. Optionally, a sum of a data allocation threshold included in the first data allocation information and a data allocation threshold included in the second data allocation information is equal to a total amount of data that can be received according to the radio access capability of the UE. When the data allocation threshold includes multiple radio access capability parameters of the UE, information about data amounts allocated by the first base station to the first base station and to the second base station should satisfy all the foregoing multiple parameters. In addition, the first base station may also send the second data allocation information that includes a data allocation ratio and the radio access capability parameter of the UE to the second base station, and instructs the second base station to obtain a data allocation threshold according to the data allocation ratio and the radio access capability parameter of the UE.

In addition, in this embodiment of the present invention, the data allocation information includes subframe information. The first base station and the second base station may send data to the UE according to the subframe information, that is, the subframe information includes at least one subframe number allocated by the first base station to the first base station and at least one subframe number allocated by the first base station to the second base station.

Figure 5:
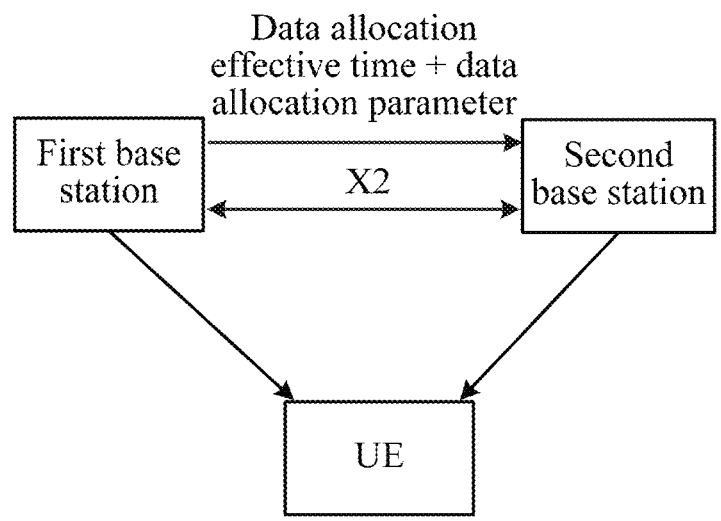
FIG. 5 is a schematic diagram of allocating different subframe information for different base stations according to an embodiment of the present invention.

Optionally, the first base station obtains a sending subframe bitmap (subframe bitmap) according to the at least one subframe number (which is referred to as a first subframe number in the following) allocated to the first base station and the at least one subframe number (which is referred to as a second subframe number in the following) allocated to the second base station, that is, the subframe bitmap includes subframe numbers separately occupied when the first base station and the second base station send data to the UE; the first base station sends the subframe bitmap to the UE at a preset moment, and instructs the UE to switch, according to the sending subframe bitmap and in a subframe corresponding to the first subframe number of the first base station, to a non-active discontinuous reception state in a serving cell within the management area of the second base station. In addition, the first base station may also send the subframe bitmap and the data allocation effective time to the UE at the preset moment, and instruct the UE to switch, according to the data allocation effective time and the sending subframe bitmap, and in a subframe corresponding to the first subframe number of the first base station after a moment corresponding to the data allocation effective time, to a non-active discontinuous reception state in a serving cell within the management area of the second base station, as shown in FIG. 5.

The preset moment may be before the sending of the second data allocation information by the first base station to the second base station, or may be during the sending of the second data allocation information by the first base station to the second base station, or may further be after the sending of the second data allocation information by the first base station to the second base station; moreover, the first subframe number and the second subframe number are different. For example, first subframe numbers being 1 to 5 indicate that the first base station sends data to the UE in subframes 1 to 5 of a frame, and second subframe numbers being 6 to 10 indicate that the second base station sends data to the UE in subframes 6 to 10 of a frame. That is, different base stations send data to the UE in different subframes. In this case, only one base station sends data to the UE in each subframe; after the base station obtains the radio access capability parameter of the UE, the base station can control that an amount of data sent to the UE satisfies a total amount of data that can be received according to the radio access capability of the UE.

In the foregoing process, the non-active discontinuous reception state means that the UE is not in an active time (active time). In a subframe corresponding to the non-active state, the UE does not listen on a physical downlink control channel (Physical Downlink Control Channel, PDCCH), does not receive a physical downlink shared channel (Physical Downlink Shared Channel, PDSCH), does not send information such as a periodic sounding reference signal (Sounding Reference Signal, SRS) and a channel quality indication (Channel Quality Indication, CQI), and does not send uplink information on a physical uplink shared channel (Physical Uplink Shared Channel, PUSCH). It can be seen that, by using the technical solution of the present invention, at the first subframe number of the first base station, the UE may not listen on a PDCCH of a serving cell within the management area of the second base station, or the like, thereby effectively reducing energy consumption of the UE.

In this embodiment of the present invention, when the subframe bitmap does not change, the first base station does not need to instruct the UE to switch a state in a subframe that is corresponding to the first subframe number and of each frame, but instructs the UE to switch a state only in a subframe that is corresponding to the first subframe number and of a specified frame. By using the foregoing technical solution, in each subframe that is corresponding to the first subframe number and in which the first base station sends the first data, a transceiver corresponding to the second base station is turned off in the UE, thereby further reducing energy consumption of the UE and improving quality of a signal received by the UE.

After the first base station obtains the second data allocation information corresponding to the second base station, the first base station sends the second data allocation information to the second base station. Optionally, the first base station sends the second data allocation information to the second base station only when the first base station determines that a preset condition is met. Specifically, when the first base station determines that the subframe bitmap does not change, and a current subframe is not a subframe that is corresponding to the first subframe number and of a specified frame in the subframe bitmap, the first base station allocates the second subframe number to the second base station; when the first base station determines that the subframe bitmap changes, and a current subframe is not a subframe that is corresponding to an updated first subframe number and of the specified frame in an updated subframe bitmap, the first base station allocates an updated second subframe number to the second base station. Alternatively, when the first base station determines that the subframe bitmap does not change, and a current subframe is not a subframe that is corresponding to the first subframe number and of the first frame after the moment corresponding to the data allocation effective time, the first base station allocates the second subframe number to the second base station; when the first base station determines that the sending subframe bitmap changes, and a current subframe is not a subframe that is corresponding to an updated first subframe number and of the first frame after the moment corresponding to the data allocation effective time, the first base station allocates an updated second subframe number to the second base station. It can be seen that the first base station may send the sending subframe bitmap only in a case in which the first base station determines that downlink data sent simultaneously by multiple base stations within a TTI may exceed a receiving capability of the UE. For example, the UE aggregates two serving cells within the management area of the first base station and two serving cells within the management area of the second base station. When wireless conditions of the cells are good, for UE of UE capability category 6, data sent simultaneously by the first base station and the second base station to the UE may exceed a radio access capability parameter of the UE; when the wireless conditions of the serving cells are lower than a given threshold, data sent simultaneously by the first base station and the second base station to the UE may not exceed a receiving capability of the UE. Therefore, by using the foregoing technical solution, the first base station sends the second data allocation information to the second base station only when the preset condition is met, thereby effectively reducing signaling exchange between devices and reducing system consumption.

The first base station may also send second data allocation information that includes both a data allocation threshold and data allocation timing information to the second base station. Specifically, the first base station allocates a third subframe number and a first MIMO mode to the first base station, allocates a fourth subframe number and a second MIMO mode to the second base station, and sends second data allocation information that includes the fourth subframe number and the second MIMO mode to the second base station, where the MIMO mode is a maximum number of supported layers for spatial multiplexing in downlink. The third subframe number and the fourth subframe number may be the same (for example, both the third sending subframe numbers and the fourth sending subframe numbers are 0 to 4), or may be different (for example, the third sending subframe numbers are 0 to 4, and the second sending subframe numbers are 4 to 6).

Step 310: The first base station instructs a second base station to send, according to second data allocation information that is determined according to the radio access capability of the UE, data to the UE.

In this embodiment of the present invention, when the data allocation information includes the data allocation effective time, the first base station instructs the second base station to send, according to the second data allocation information, the second data to the UE at the moment corresponding to the data allocation effective time.

In step 300, at the first subframe number of the first base station, the UE switches, in the serving cell within the management area of the second base station, to the non-active discontinuous reception state; similarly, at the second subframe number of the second base station, the UE switches, in the serving cell within the management area of the first base station, to the non-active discontinuous reception state. In a subframe corresponding to the second subframe number, the UE may not listen on a PDCCH of the serving cell within the management area of the first base station or the like, and a transceiver corresponding to the first base station is turned off in the UE, thereby effectively reducing energy consumption of the UE.

In the foregoing process, the second base station directly sends the second data to the UE according to the data allocation information. To ensure accuracy of the process of configuring the inter-base station carrier aggregation, optionally, the first base station sends a measurement report to the second base station, and instructs the second base station to update, according to the measurement report, the second data allocation information; and the first base station obtains updated second data allocation information sent by the second base station. A process of obtaining the measurement report by the second base station is: forwarding, by the first base station to the second base station, the measurement report obtained by the first base station; or obtaining, by the second base station, the measurement report reported by the UE.

Figure 6:
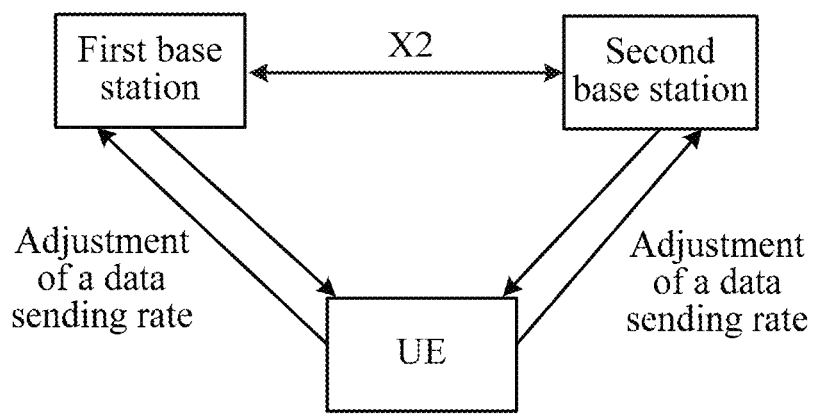
FIG. 6 is schematic diagram 2 of information exchange when multiple base stations separately schedule UE independently according to an embodiment of the present invention.

In this embodiment of the present invention, the UE receives and obtains a data sending rate of the first base station and a data sending rate of the second base station, and when determining that an absolute value of a difference between the data sending rate of the first base station and the data sending rate of the second base station is greater than a preset threshold, the UE sends data sending rate adjustment information that is generated based on hybrid automatic repeat request (Automatic Repeat reQuest, HARQ) feedback information or a Radio Link Control (Radio Link Control, RLC) status report to the first base station and the second base station. The first base station obtains the data sending rate adjustment information sent by the UE, and adjusts, according to the data sending rate adjustment information, a rate for sending data to the UE. For example, the data sending rate of the first base station is a1, the data sending rate of the second base station is a2, and a1>a2. When a1−a2>a (the preset threshold), the first base station reduces the data sending rate according to the data sending rate adjustment information, as shown in FIG. 6.

Figure 7:
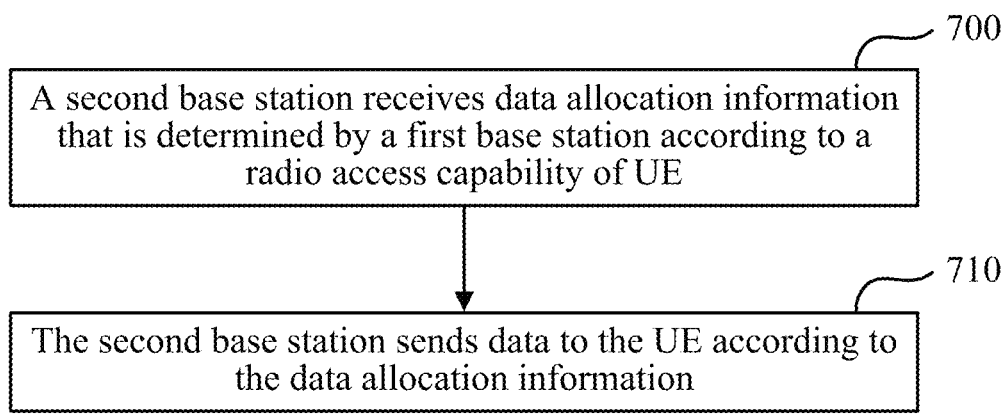
FIG. 7 is detailed flowchart 2 of a communication process when multiple base stations schedule UE separately according to an embodiment of the present invention.

Referring to FIG. 7, in an embodiment of the present invention, a detailed process of sending, by a second base station, data to UE according to an instruction of a first base station is as follows:

Step 700: A second base station receives data allocation information that is determined by a first base station according to a radio access capability of UE.

In this embodiment of the present invention, the data allocation information includes a data allocation threshold and/or data allocation timing information. The first base station performs carrier aggregation with the second base station.

Step 710: The second base station sends data to the UE according to the data allocation information.

In this embodiment of the present invention, a total amount of data that is sent by the first base station and the second base station to the UE in a same TTI does not exceed a total amount of data that can be received according to the radio access capability of the UE. If the data allocation information includes a data allocation effective time, the second base station sends, according to the data allocation information, the data to the UE at a moment corresponding to the data allocation effective time.

The second base station obtains, according to the data allocation information, a data allocation threshold and/or data allocation timing information allocated to the second base station.

In the foregoing process, the second base station obtains, according to the data allocation information, one of or any combination of the following parameters as the data allocation threshold: a maximum number of DL-SCH transport block bits received within a TTI after allocation, a maximum number of bits of a DL-SCH transport block received within a TTI after allocation, a total number of soft channel bits after allocation, a maximum number of supported layers for spatial multiplexing in downlink after allocation, and a maximum number of PDCP SDUs within a TTI after allocation.

If the data allocation information includes the data allocation timing information, the second base station sends, according to subframe information carried in the data allocation information, data to the UE in a corresponding subframe included in the subframe information. If the data allocation information includes the data allocation timing information and the data allocation threshold, the second base station sends, according to subframe information and a MIMO mode carried in the data allocation information, data to the UE in a corresponding subframe included in the subframe information according to the MIMO mode.

Optionally, the second base station sends a subframe bitmap to the UE, and instructs the UE to switch, according to the data allocation effective time and the subframe bitmap, and in a subframe corresponding to a subframe number for data sending by the second base station, to a non-active discontinuous reception state in a serving cell within a management area of the first base station. If data allocation information further includes the data allocation effective time, the second base station sends the subframe bitmap and the data allocation effective time to the UE, and instructs the UE to switch, according to the data allocation effective time and the subframe bitmap, and in a subframe that is corresponding to a subframe number for data sending by the second base station and of a frame corresponding to the data allocation effective time, to the non-active discontinuous reception state in the serving cell within the management area of the first base station, where the subframe bitmap for data sending includes a subframe number corresponding to data sending by the first base station and a subframe number corresponding to data sending by the second base station.

In the foregoing process, the second base station directly sends data to the UE according to the data allocation information. To ensure accuracy of a process of configuring inter-base station carrier aggregation, optionally, the second base station obtains, according to a measurement report of the UE, data allocation information that is generated locally; when the second base station determines that the data allocation information sent by the first base station is different from the data allocation information that is generated locally, the second base station sends, to the first base station, the data allocation information that is allocated locally, and notifies the first base station to update, according to the data allocation information that is allocated locally, the data allocation information that is sent previously by the first base station to the second base station.

Particularly, the second base station receives data sending rate adjustment information that is sent by the UE and generated based on HARQ feedback information or an RLC status report, and adjusts, according to the data sending rate adjustment information, a rate for sending data to the UE.

Figure 8:
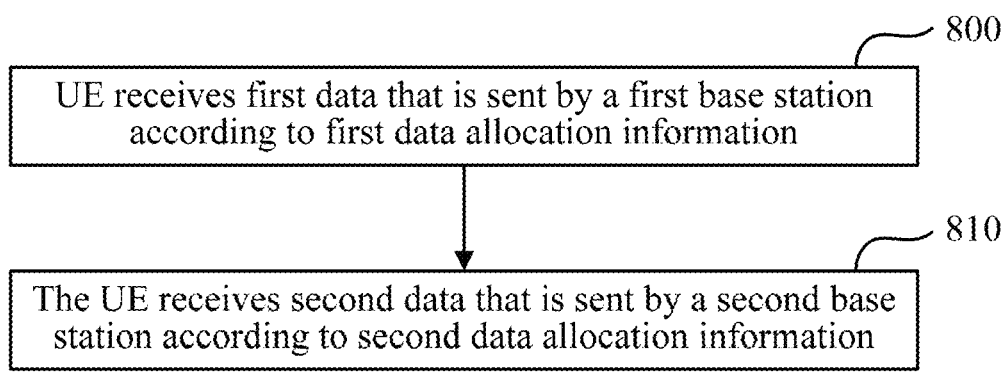
FIG. 8 is detailed flowchart 3 of a communication process when multiple base stations schedule UE separately according to an embodiment of the present invention.

Referring to FIG. 8, in an embodiment of the present invention, a detailed process of receiving, by UE, data according to downlink resources allocated by a first base station and a second base station is as follows:

Step 800: UE receives first data that is sent by a first base station according to first data allocation information.

In this embodiment of the present invention, the first data allocation information includes a data allocation threshold and/or data allocation timing information.

When the first data allocation information includes the data allocation threshold, the UE receives a corresponding amount of data that is sent by the first base station according to the data allocation threshold; when the first data allocation information includes the data allocation timing information, the UE receives data that is sent by the first base station in a subframe corresponding to a first subframe number included in the data allocation timing information.

Optionally, when in the subframe corresponding to the first subframe number, the UE switches to a non-active discontinuous reception state in a serving cell managed by the second base station, thereby effectively reducing energy consumption of the UE.

Step 810: The UE receives second data that is sent by a second base station according to second data allocation information.

In this embodiment of the present invention, the first base station performs carrier aggregation with the second base station, and a total amount of the first data sent by the first base station and the second data sent by the second base station that are received by the UE in a same TTI does not exceed a total amount of data that can be received by the UE according to a radio access capability of the UE.

The second data allocation information is sent by the first base station to the second base station. The UE receives the second data that is sent by the second base station in a subframe corresponding to a second subframe number included in the second data allocation timing information.

Optionally, in the subframe corresponding to the second subframe number, the UE switches to a non-active discontinuous reception state in a serving cell managed by the first base station, thereby effectively reducing energy consumption of the UE.

Particularly, the UE obtains a first data sending rate corresponding to the first base station and a second data sending rate corresponding to the second base station; and when the UE determines that an absolute value of a difference between the first data sending rate and the second data sending rate is greater than a preset threshold, the UE sends data sending rate adjustment information that is generated based on HARQ feedback information or an RLC status report to the first base station or the second base station, and notifies the first base station or the second base station to adjust the data sending rate. In this embodiment of the present invention, the data sending rate may be determined according to a sequence number corresponding to a data block.

Figure 9:
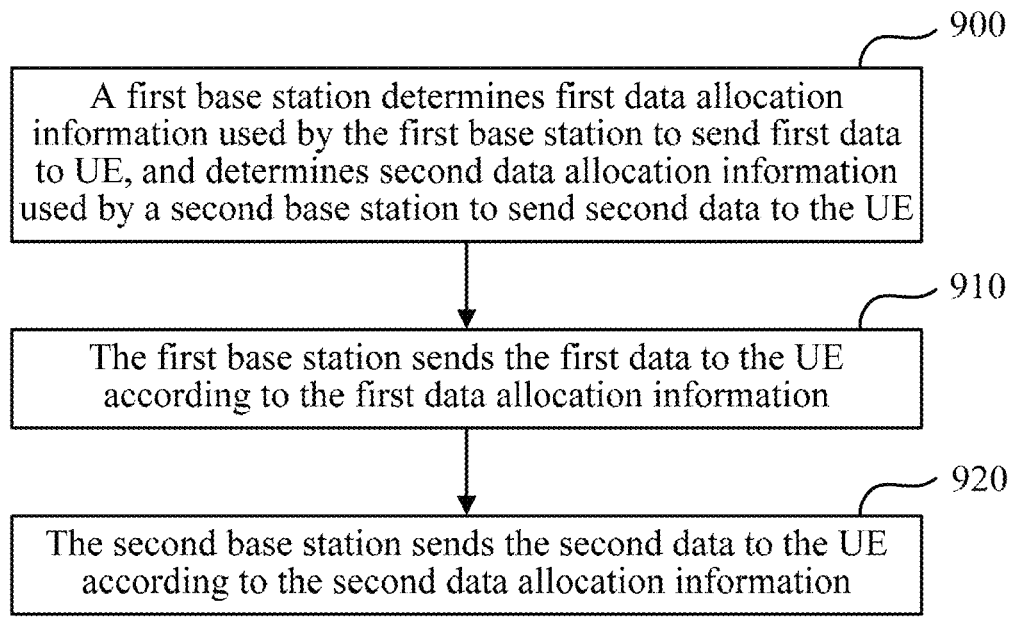
FIG. 9 is detailed flowchart 4 of a communication process when multiple base stations schedule UE separately according to an embodiment of the present invention.

Referring to FIG. 9, in an embodiment of the present invention, a detailed process of data sending is as follows:

Step 900: A first base station determines first data allocation information used by the first base station to send first data to UE, and determines second data allocation information used by a second base station to send second data to the UE.

In this embodiment of the present invention, the data allocation information includes a data allocation threshold and/or data allocation timing information, and the data allocation information further includes a data allocation effective time.

The data allocation threshold may include any one or combination of the following parameters: a maximum number of DL-SCH transport block bits received within a TTI, a maximum number of bits of a DL-SCH transport block received within a TTI, a total number of soft channel bits, a maximum number of supported layers for spatial multiplexing in downlink, and a maximum number of PDCP SDUs within a TTI.

The data allocation timing information is subframe information, and includes: at least one first subframe number and at least one third subframe number of the first base station, and at least one second subframe number and at least one fourth subframe number of the second base station.

Step 910: The first base station sends the first data to the UE according to the first data allocation information.

In this embodiment of the present invention, if the first data allocation information is the data allocation threshold, the first base station sends, according to the data allocation threshold, an amount of data that does not exceed a data amount corresponding to the data allocation threshold to the UE. If the second data allocation information is the data allocation timing information, the first base station sends, in a subframe corresponding to the first subframe number of the first base station in the data allocation timing information, the first data to the UE. If the first data allocation information is the data allocation timing information and the data allocation threshold, the first base station sends, in a subframe corresponding to the third subframe number of the first base station in the data allocation timing information, the first data to the UE according to a first MIMO mode.

Optionally, in the subframe corresponding to the first subframe number, the UE switches to a non-active discontinuous reception state in a serving cell within a management area of the second base station.

Particularly, the first base station receives data sending rate adjustment information sent by the UE, and adjusts, according to the data sending rate adjustment information, a rate for sending data to the UE.

Step 920: The second base station sends the second data to the UE according to the second data allocation information.

In this embodiment of the present invention, when the data allocation information includes the data allocation effective time, the second base station may send data to the UE at a moment corresponding to the data allocation effective time, thereby ensuring that the first base station and the second base station send data to the UE at an appointed time, and facilitating coordination, by the first base station, of data allocation among multiple base stations.

If the data allocation information is the data allocation threshold, the second base station sends, to the UE according to the data allocation threshold, an amount of data that does not exceed a data amount corresponding to the data allocation threshold. If the data allocation information is the data allocation timing information, the second base station sends, in a subframe corresponding to the second subframe number of the second base station in the data allocation timing information, the second data to the UE. If the data allocation information includes the data allocation timing information and the data allocation threshold, the second base station sends, in a subframe corresponding to the fourth subframe number of the second base station in the data allocation timing information, the data to the UE according to a second MIMO mode.

Optionally, in the subframe corresponding to the second subframe number, the UE switches to a non-active discontinuous reception state in a serving cell within a management area of the first base station.

Particularly, the second base station receives data sending rate adjustment information sent by the UE, and adjusts, according to the data sending rate adjustment information, a rate for sending data to the UE.

A detailed process of data sending is described in detail in the following with reference to a specific application scenario and by using an example in which an inter-base station carrier aggregation configuration system includes a first base station and a second base station, and UE is UE of category 6 in Table 1.

Figure 10:
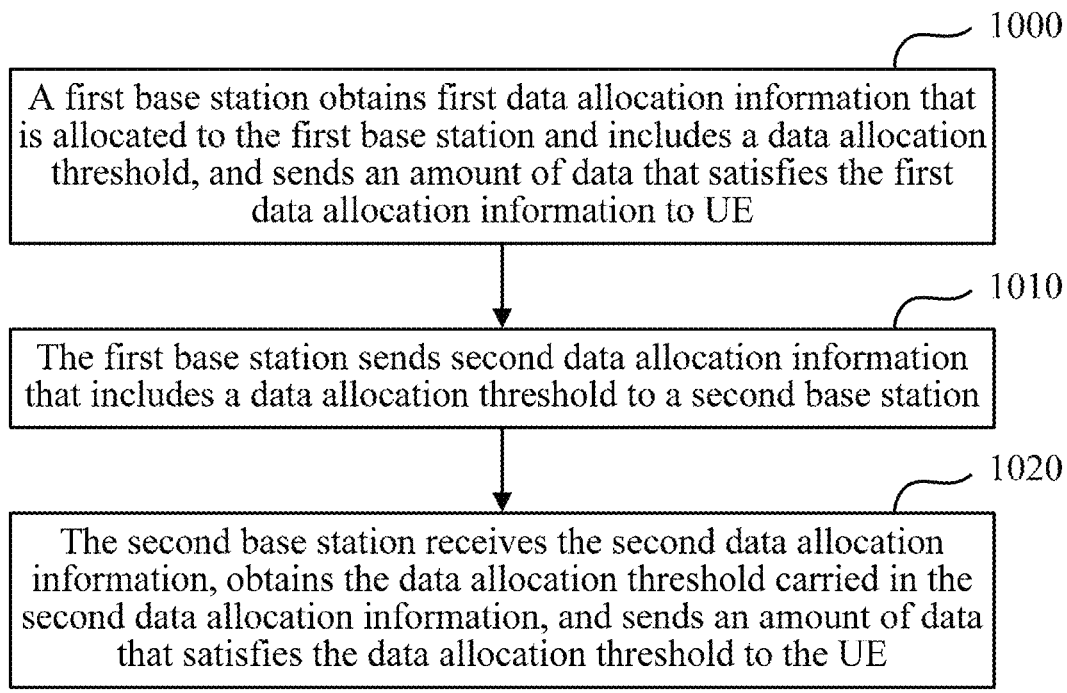
FIG. 10 is flowchart 1 of a communication process when multiple base stations schedule UE separately in a specific application scenario according to an embodiment of the present invention.

Implementation Manner 1:

A first base station obtains, according to a measurement report reported by UE, first data allocation information used by the first base station to send first data to the UE, and second data allocation information used by a second base station to send second data to the UE, and the data allocation information includes only a data allocation threshold. Referring to FIG. 10, a detailed process of data sending is as follows:

Step 1000: A first base station obtains first data allocation information that is allocated to the first base station and includes a data allocation threshold, and sends an amount of data that satisfies the first data allocation information to UE.

Step 1010: The first base station sends second data allocation information that includes a data allocation threshold to a second base station.

In this embodiment of the present invention, the UE corresponds to UE of category 6 in Table 1. Referring to Table 1, it can be known that a radio access capability parameter corresponding to the UE is: a parameter value "301504" of a maximum number of DL-SCH transport block bits received within a TTI. The first base station divides the radio access capability parameter of the UE, for example, dividing the radio access capability parameter based on that data amounts corresponding to the first base station and the second base station are the same, and then the first base station and the second base station each obtain a parameter value of 150752. The first base station uses the parameter 150752 of the maximum number of DL-SCH transport block bits as the data allocation threshold and sends the data allocation threshold to the second base station. In this case, even if multiple serving cells and multiple layers of MIMOs are configured for the first base station or the second base station, and an actual sending capability of the first base station or the second base station exceeds 150752, a maximum number of DL-SCH transport block bits that the first base station or the second base station sends to the UE within any TTI should be less than or equal to 150752.

In addition, a maximum number of supported layers for spatial multiplexing in downlink may also be used as the data allocation threshold. For example, for the UE whose UE capability category is 6, a parameter value of a maximum number of supported layers for spatial multiplexing in downlink is 4. The first base station divides the parameter value of the maximum number of supported layers, for example, in a dividing manner in which the first base station and the second base station share the parameter value of the maximum number of supported layers equally; then the first base station and the second base station each obtain 2 layers, and the first base station uses the parameter value 2 of the maximum number of supported layers for spatial multiplexing in downlink as the data allocation threshold and sends the data allocation threshold to the second base station. In this case, even if a parameter value of a maximum number of supported layers of the first base station and the second base station is 4, a maximum number of supported layers for spatial multiplexing in downlink that the first base station or the second base station sends to the UE within any TTI should be less than or equal to 2.

Optionally, multiple radio access capability parameters of UE may be used as the data allocation threshold at the same time, so as to ensure that a radio access capability of UE is not exceeded. In this case, the data allocation threshold allocated by the first base station should satisfy all of the multiple radio access capability parameters of the UE.

Step 1020: The second base station receives the second data allocation information, obtains the data allocation threshold carried in the second data allocation information, and sends an amount of data that satisfies the data allocation threshold to the UE.

In this embodiment of the present invention, a second base station obtains, according to a measurement report of UE, third data allocation information that is generated locally; when the second base station determines that a first data allocation threshold obtained according to data allocation information that is sent by a first base station is different from a data allocation threshold that is generated locally, the second base station sends, to the first base station, the third data allocation information that is generated locally, and notifies the first base station to update second data allocation information according to the third data allocation information that is allocated locally; and the second base station receives updated second data allocation information, and sends data to the UE according to the updated second data allocation information.

Figure 11:
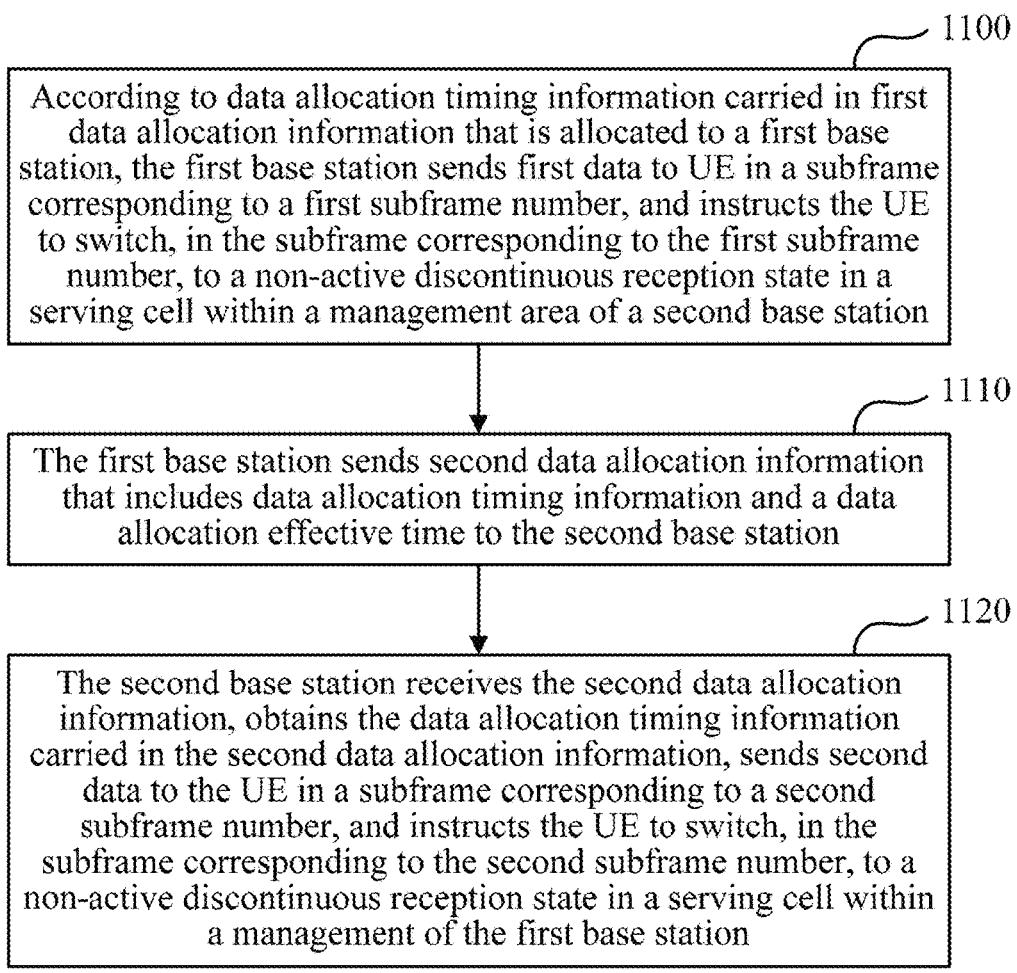
FIG. 11 is flowchart 2 of a communication process when multiple base stations schedule UE separately in a specific application scenario according to an embodiment of the present invention.

Implementation Manner 2:

A first base station obtains, according to a measurement report reported by UE, first data allocation information used by the first base station to send data to the UE, and second data allocation information used by a second base station to send data to the UE, and the data allocation information includes data allocation timing information and a data allocation effective time. Referring to FIG. 11, a detailed process of data sending is as follows:

Step 1100: According to data allocation timing information carried in first data allocation information that is allocated to a first base station, the first base station sends first data to UE in a subframe corresponding to a first subframe number, and instructs the UE to switch, in the subframe corresponding to the first subframe number, to a non-active discontinuous reception state in a serving cell within a management area of a second base station.

Step 1110: The first base station sends second data allocation information that includes data allocation timing information and a data allocation effective time to the second base station.

In this embodiment of the present invention, the first base station obtains a subframe bitmap according to first subframe numbers (such as 1, 4 and 7) and second subframe numbers (such as 2, 3 and 8) carried in the data allocation timing information, uses the subframe bitmap and the data allocation effective time as the second data allocation information, and sends the second data allocation information to the second base station.

In this embodiment of the present invention, the data allocation effective time may be represented as an absolute time information system frame number SFN+subframe number subframe.

The data allocation timing information varies with load, wireless conditions, data splitting algorithms and traffic control situations that are corresponding to a serving cell within a management area of the first base station and a serving cell within a management area of the second base station. When the first base station determines that the data allocation timing information changes, the first base station should send updated data allocation timing information to the second base station.

Step 1120: The second base station receives the second data allocation information, obtains the data allocation timing information carried in the second data allocation information, sends second data to the UE in a subframe corresponding to a second subframe number, and instructs the UE to switch, in the subframe corresponding to the second subframe number, to a non-active discontinuous reception state in a serving cell managed by the first base station.

In this embodiment of the present invention, when UE needs to receive first data sent by a first base station, a transceiver corresponding to a second base station is turned off or serving cells serving the second base station are deactivated; similarly, when the UE receives only second data sent by the second base station, a transceiver corresponding to the first base station is turned off or serving cells serving the first base station are deactivated. When the UE needs to receive again data sent by the first base station or the second base station, the serving cells within a management area of the first base station or the serving cells within a management area of the second base station are activated. Switching the UE to the non-active discontinuous reception state means: for the serving cells within the management area of the first base station, the UE receives downlink data according to a same DRX rule, for example, simultaneously listening on or not listening on a physical downlink control channel in the serving cells managed by the first base station; for the serving cells within the management area of the second base station, the UE receives downlink information according to a same DRX rule, for example, simultaneously listening on or not listening on a PDCCH in the serving cells managed by the second base station; for the first base station and the second base station, the UE may receive downlink information without following a same DRX rule, for example, the UE listens on the PDCCH in the serving cells managed by the first base station, and does not listen on the PDCCH in the serving cells managed by the second base station.

Figure 12:
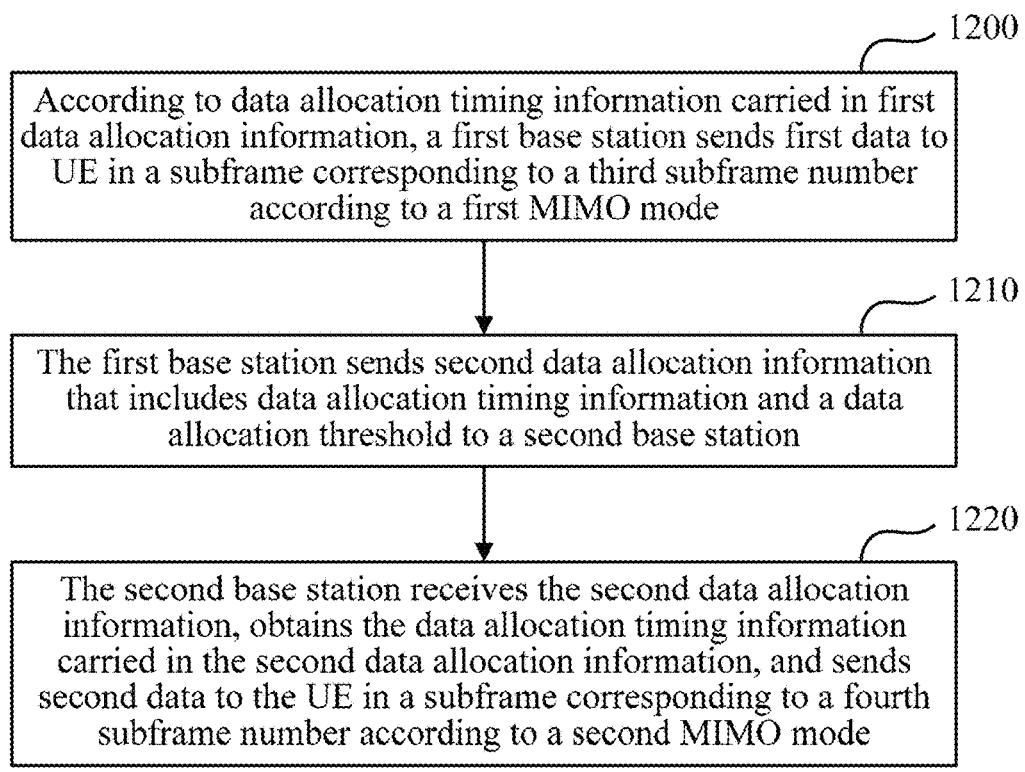
FIG. 12 is flowchart 3 of a communication process when multiple base stations schedule UE separately in a specific application scenario according to an embodiment of the present invention.

Implementation Manner 3:

A first base station obtains, according to a measurement report reported by UE, first data allocation information used by the first base station to send data to the UE, and second data allocation information used by a second base station to send data to the UE, and the data allocation information includes data allocation timing information and a data allocation threshold. Referring to FIG. 12, a detailed process of data sending is as follows:

Step 1200: According to data allocation timing information carried in first data allocation information, a first base station sends first data to UE in a subframe corresponding to a third subframe number according to a first MIMO mode.

Step 1210: The first base station sends second data allocation information that includes data allocation timing information and a data allocation threshold to a second base station.

In this embodiment of the present invention, the first base station obtains a subframe bitmap according to third subframe numbers (such as 0 to 3) and fourth subframe numbers (such as 0 to 3) carried in the data allocation timing information, obtains a first MOMO mode (such as 3 layers) allocated to the first base station and a second MIMO mode (such as 1 layer) allocated to the second base station, uses the subframe bitmap and the data allocation threshold as the data allocation information, and sends the data allocation information to the second base station.

Step 1220: The second base station receives the second data allocation information, obtains the data allocation timing information carried in the second data allocation information, and sends second data to the UE in a subframe corresponding to a fourth subframe number according to a second MIMO mode.

Figure 13:
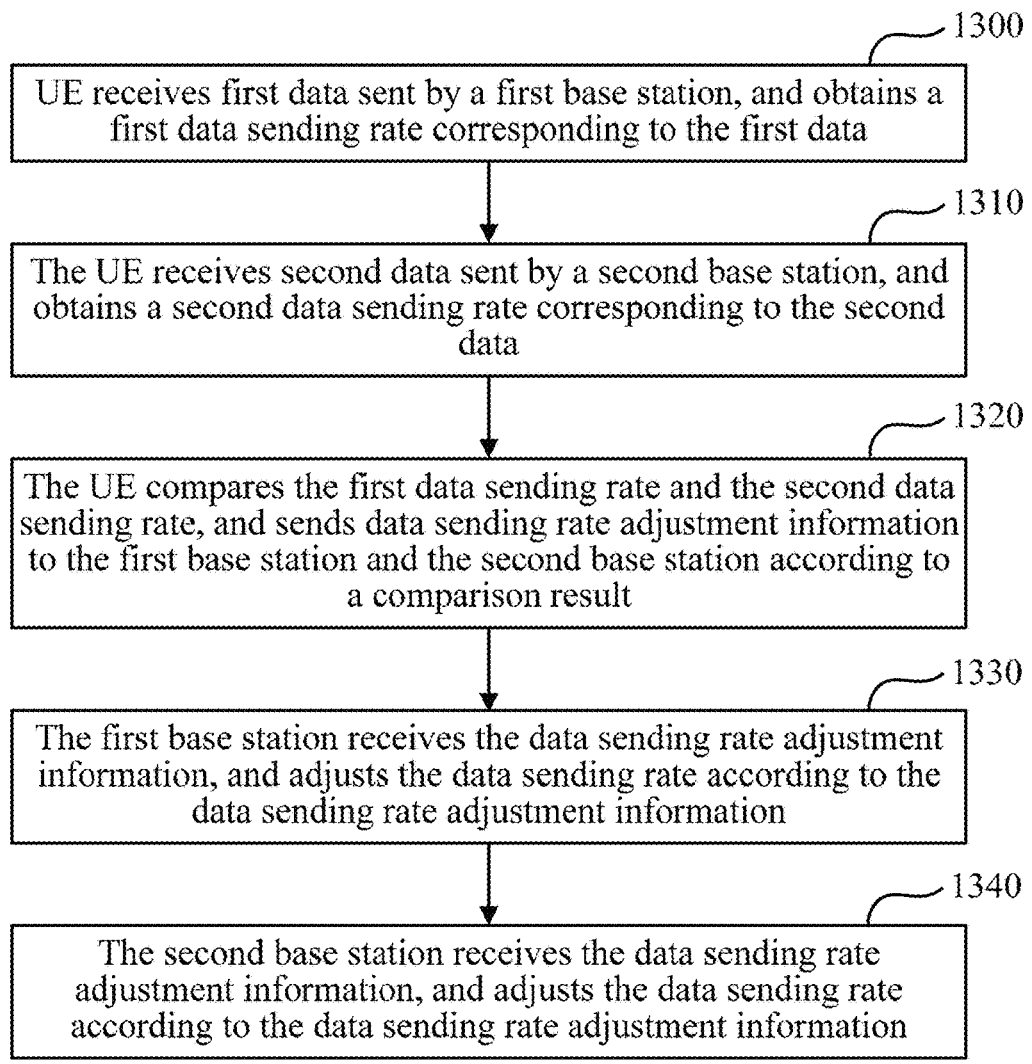
FIG. 13 is flowchart 4 of a communication process when multiple base stations schedule UE separately in a specific application scenario according to an embodiment of the present invention.

Implementation Manner 4:

A first base station obtains, according to a measurement report reported by UE, first data allocation information used by the first base station to send data to the UE, and second data allocation information used by a second base station to send data to the UE. Referring to FIG. 13, a detailed process of controlling, by the first base station and the second base station, data sending according to a data allocation rate determining result of the UE is as follows:

Step 1300: UE receives first data sent by a first base station, and obtains a first data sending rate corresponding to the first data.

Step 1310: The UE receives second data sent by a second base station, and obtains a second data sending rate corresponding to the second data.

Step 1320: The UE compares the first data sending rate and the second data sending rate, and sends data sending rate adjustment information to the first base station and the second base station according to a comparison result.

In this embodiment of the present invention, the data sending rate is obtained by using a sequence number of a received data block. By using RLC PDU splitting as an example, specifically, unbalanced wireless resource scheduling causes a relatively large difference in sequence numbers of RLC PDUs sent by different base stations (that is, a difference between sequence numbers is relatively large), and therefore, the UE needs a larger RLC sending window and/or receiving window. As shown in FIG. 5, for downlink data receiving, the UE determines a distance between maximum sequence numbers of RLC PDUs sent by the first base station and the second base station in a preset time period; when the distance is greater than a preset threshold, the UE sends data sending rate decrease information to a base station that sends RLC PDUs at a fast rate, and/or sends data sending rate increase information to a base station that sends RLC PDUs at a slow rate. The data sending rate may refer to a number of RLC PDUs or an amount of downlink data sent by a physical layer, such as a number of bits.

Step 1330: The first base station receives the data sending rate adjustment information, and adjusts the data sending rate according to the data sending rate adjustment information.

Step 1340: The second base station receives the data sending rate adjustment information, and adjusts the data sending rate according to the data sending rate adjustment information.

By using the foregoing technical solution, a data sending rate of RLC PDUs corresponding to one or more base stations may be accelerated or decelerated, so that an RLC receiving window or a reordering window corresponding to UE is reduced in size, thereby alleviating pressure on "a total buffer size of Layer 2".

Figure 14:
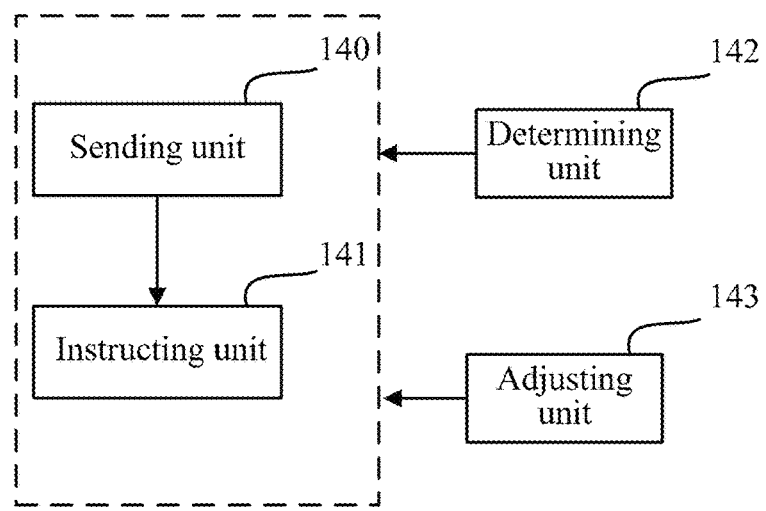
FIG. 14 is schematic structural diagram 1 of a base station in a process in which multiple base stations schedule UE separately according to an embodiment of the present invention.

Based on the foregoing technical solutions, referring to FIG. 14, the present invention provides a base station, including a sending unit 140 and an instructing unit 141.

The sending unit 140 is configured to send first data to UE according to first data allocation information that is determined according to a radio access capability of the UE.

The instruction unit 141 is configured to instruct a carrier aggregation base station to send, according to second data allocation information that is determined according to the radio access capability of the UE, second data to the UE, where the carrier aggregation base station performs carrier aggregation with the base station, a total amount of the first data sent by the base station and the second data sent by the carrier aggregation base station to the UE in a TTI does not exceed a total amount of data that can be received by the UE according to the radio access capability of the UE.

The base station further includes a determining unit 142, configured to determine the first data allocation information that includes a data allocation threshold for sending the first data to the UE and/or data allocation timing information for sending the first data to the UE, and determine the second data allocation information that includes a data allocation threshold for sending the second data to the UE by the carrier aggregation base station and/or data allocation timing information for sending the second data to the UE by the carrier aggregation base station.

The foregoing base station further includes an adjusting unit 143, configured to: send a measurement report to the second base station, and instruct the second base station to update, according to the measurement report, the second data allocation information; and receive updated second data allocation information sent by the second base station.

When the first data allocation information and the second data allocation information include the data allocation thresholds, the determining unit 142 is specifically configured to use at least any one of the following parameters as the data allocation thresholds: a maximum number of DL-SCH transport block bits received within a TTI, a maximum number of bits of a DL-SCH transport block received within a TTI, a total number of soft channel bits, a maximum number of supported layers for spatial multiplexing in downlink, and a maximum number of PDCP SDUs within a TTI.

When the first data allocation information and the second data allocation information each include the data allocation timing information, the determining unit 142 is specifically configured to determine the data allocation timing information that includes subframe information, where the base station or the carrier aggregation base station sends data to the UE according to the subframe information.

The sending unit 140 is further configured to: when the first data allocation information and the second data allocation information carry the subframe information, send a subframe bitmap to the UE, where the subframe bitmap includes a subframe number occupied when the base station sends the first data to the UE and a subframe number occupied when the carrier aggregation base station sends the second data to the UE.

The instructing unit 141 is further configured to instruct the carrier aggregation base station to send data to the UE in a corresponding subframe.

In this embodiment of the present invention, at a first subframe number of the first base station, the UE may not listen on a PDCCH of a serving cell within a management area of the second base station, thereby effectively reducing energy consumption of the UE.

The determining unit 142 is further configured to determine the data allocation threshold that includes an MIMO mode used by the base station or the carrier aggregation base station to send data to the UE, where the MIMO mode is a maximum number of supported layers for spatial multiplexing in downlink.

The determining unit 142 is specifically configured to: receive a signal quality parameter and identification information corresponding to the UE that are sent by the UE; obtain a radio access capability parameter of the UE according to the identification information corresponding to the UE; and according to the signal quality parameter and the radio access capability parameter of the UE, determine the first data allocation information and determine the second data allocation information of the second base station.

The determining unit 142 is specifically configured to: determine the first data allocation information and the second data allocation information according to a preset period; or determine the first data allocation information and the second data allocation information according to a measurement report or quality of service QoS reported by the UE.

In this embodiment of the present invention, the first data allocation information of the first base station and second data allocation information of the second base station are obtained according to the signal quality parameter. When signal quality corresponding to a serving cell within a management area of a base station is better, a larger amount of data to be sent may be allocated to the base station, so that a base station with better signal quality carries a larger amount of data to be sent, which effectively increases a throughput of a system.

The determining unit 142 is specifically configured to: determine the first data allocation information and the second data allocation information that each include a data allocation effective time.

When the first data allocation information includes the data allocation effective time, the sending unit 140 is specifically configured to: send the first data to the UE according to the first data allocation information at a moment corresponding to the data allocation effective time included in the first data allocation information.

When the second data allocation information includes the data allocation effective time, the instructing unit 141 is specifically configured to: instruct the carrier aggregation base station to send, according to the second data allocation information at a moment corresponding to the data allocation effective time included in the second data allocation information, the second data to the UE.

The adjusting unit 143 is further configured to: receive HARQ feedback information or an RLC status report sent by the UE, and adjust, according to the HARQ feedback information or the RLC status report, a rate for sending data to the UE.

In this embodiment of the present invention, a base station allocates, according to a radio access capability of UE and a measurement report reported by the UE, data allocation information that satisfies the radio access capability of the UE to the base station and a carrier aggregation base station that performs carrier aggregation with the base station, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

Figure 15:
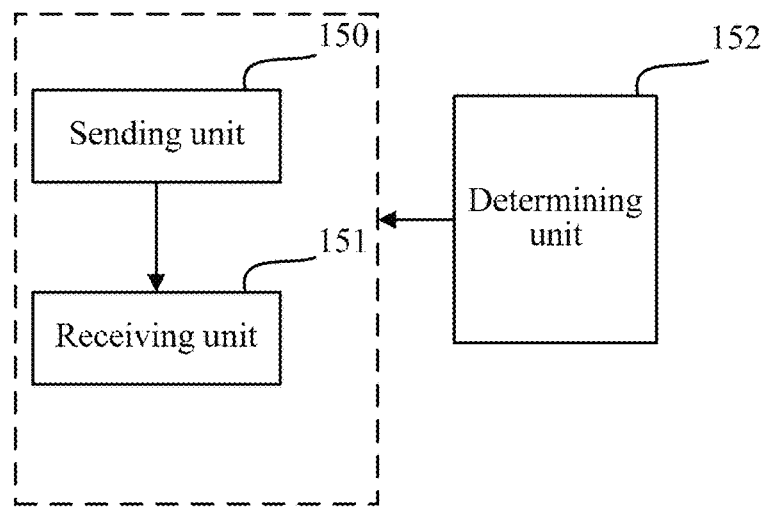
FIG. 15 is schematic structural diagram 2 of a base station in a process in which multiple base stations schedule UE separately according to an embodiment of the present invention.

Referring to FIG. 15, the present invention further provides a base station, including a receiving unit 150 and a sending unit 151.

The receiving unit 150 is configured to receive data allocation information that is determined by a first base station according to a radio access capability of UE, and send the data allocation information to the data sending unit.

The sending unit 151 is configured to receive the data allocation information sent by the receiving unit, and send data to the UE according to the data allocation information, where the first base station performs carrier aggregation with the base station, and a total amount of data sent by the base stations to the UE in a same TTI does not exceed a total amount of data that can be received by the UE according to the radio access capability of the UE.

In addition, the base station further includes an adjusting unit 152, configured to send, according to a measurement report reported by the UE, updated data allocation information to the first base station.

The sending unit 151 is specifically configured to: send, according to a data allocation effective time included in the data allocation information, the data to the UE at a moment corresponding to the data allocation effective time.

The receiving unit 150 is specifically configured to receive the data allocation information that includes a data allocation threshold and/or data allocation timing information for sending data to the UE.

When the data allocation information includes the data allocation timing information, the receiving unit 150 is specifically configured to receive the data allocation timing information that includes subframe information, where the base station sends data to the UE according to the subframe information.

The sending unit 151 is further configured to: when the data allocation information carries the subframe information, send a subframe bitmap to the UE, where the subframe bitmap includes a subframe number occupied when the first base station sends the data to the UE and a subframe number occupied when the base station sends the data to the UE.

When the data allocation information includes the data allocation threshold, the receiving unit 150 is further configured to receive the data allocation threshold that includes a MIMO mode used by the base station to send data to the UE, where the MIMO mode is a maximum number of supported layers for spatial multiplexing in downlink.

The adjusting unit 152 is further configured to: receive hybrid automatic repeat request HARQ feedback information or a Radio Link Control RLC status report sent by the UE, and adjust, according to the HARQ feedback information or the RLC status report, a rate for sending data to the UE.

In this embodiment of the present invention, a base station receives data allocation information that is allocated by a first base station to the base station according to a radio access capability of UE and a measurement report reported by the UE and satisfies the radio access capability of the UE, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

Figure 16:
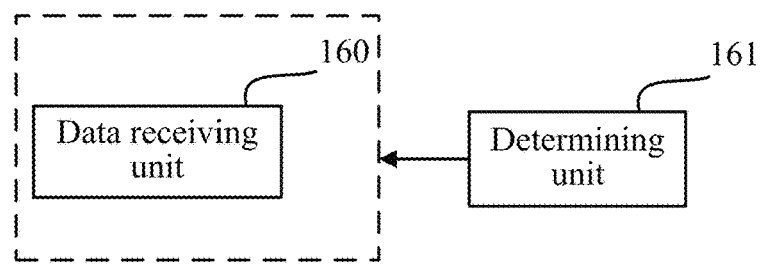
FIG. 16 is a schematic structural diagram of UE in a process in which multiple base stations schedule UE separately according to an embodiment of the present invention.

Referring to FIG. 16, the present invention provides UE, including:

a data receiving unit 160, configured to receive first data that is sent by a first base station according to first data allocation information, where the data receiving unit 160 is further configured to receive second data that is sent by a second base station according to second data allocation information; where the first data allocation information and the second data allocation information are determined by the first base station according to a radio receiving capability of the UE, and a total amount of the first data sent by the first base station and the second data sent by the second base station that are received by the UE in a same TTI does not exceed a total amount of data that can be received by the UE according to the radio access capability of the UE.

The UE further includes an adjusting unit 161, configured to: obtain a first data sending rate corresponding to the first base station and a second data sending rate corresponding to the second base station; and when it is determined that an absolute value of a difference between the first data sending rate and the second data sending rate is greater than a preset threshold, notify the first base station or the second base station to adjust the data sending rate.

The data receiving unit 160 is specifically configured to receive the first data allocation information that includes a data allocation threshold and/or data allocation timing information for sending the first data to the UE by the first base station.

The data receiving unit 160 is further configured to receive the second data allocation information that includes a data allocation threshold and/or data allocation timing information for sending the second data to the UE by the second base station.

In this embodiment of the present invention, at a first subframe number of the first base station, the UE may not listen on a PDCCH of a serving cell within a management area of the second base station, thereby effectively reducing energy consumption of the UE.

When the first data allocation information and the second data allocation information each include the data allocation timing information, the data receiving unit 160 is specifically configured to receive data that is sent by the first base station or the second base station to the UE according to subframe information included in the data allocation timing information.

The data receiving unit 160 is further configured to: receive a subframe bitmap sent by the first base station and/or the second base station, where the subframe bitmap includes a subframe number occupied when the first base station sends the first data to the UE and a subframe number occupied when the second base station sends the second data to the UE; receive, according to the subframe bitmap and in a subframe corresponding to the subframe number occupied when the first base station sends the first data to the UE, the first data sent by the first base station; and receive, in a subframe corresponding to the subframe number occupied when the second base station sends the second data to the UE, the second data sent by the second base station.

By using the foregoing technical solution, UE detects data sending rates of a first base station and a second base station; when determining that the data sending rate of the first base station and the data sending rate of the second base station meet a preset condition, the UE notifies the first base station or the second base station to dynamically adjust their corresponding data sending rates. By using a method of controlling traffic at a wireless interface of the UE, it is ensured that an amount of data received by the UE within a TTI satisfies a total amount of data that can be received according to a radio access capability of the UE, thereby further improving integrity of data received by the UE.

In this embodiment of the present invention, UE receives data allocation information that is allocated by a first base station to the first base station and a second base station according to a radio access capability of the UE and a measurement report reported by the UE, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

Figure 17:
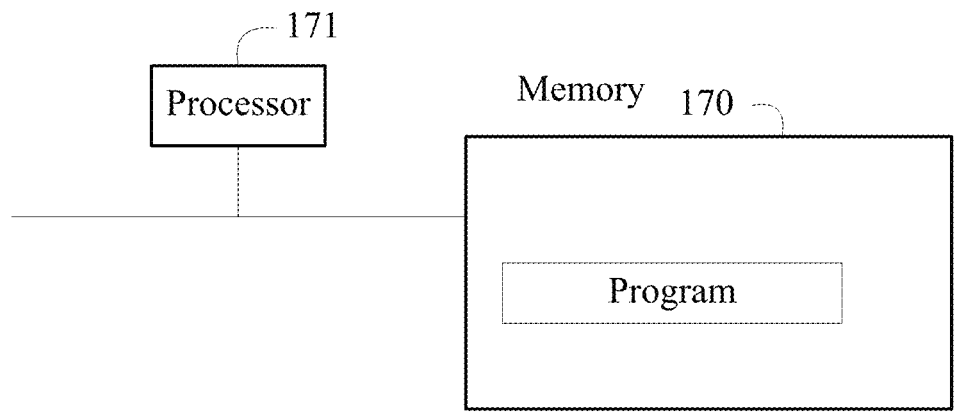
FIG. 17 is schematic diagram 1 of a base station device in a process in which multiple base stations schedule UE separately according to an embodiment of the present invention.

Referring to FIG. 17, the present invention provides a base station device, including a memory 170 and a processor 171.

The memory 170 is configured to store an application program.

The processor 171 is configured to invoke the application program in the memory 170 to perform the following operation: sending first data to UE according to first data allocation information that is determined according to a radio access capability of the UE.

The processor 171 is further configured to invoke the application program in the memory 170 to perform the following operation: instructing a carrier aggregation base station to send, according to second data allocation information that is determined according to the radio access capability of the UE, second data to the UE, where the carrier aggregation base station performs carrier aggregation with the base station, a total amount of the first data sent by the base station and the second data sent by the carrier aggregation base station to the UE in a same TTI does not exceed a total amount of data that can be received by the UE according to the radio access capability of the UE.

The processor 171 in this embodiment of the present invention may perform actions of the first base station in the foregoing method embodiments, which are not described in detail herein again.

In this embodiment of the present invention, a base station allocates, according to a radio access capability of UE and a measurement report reported by the UE, data allocation information that satisfies the radio access capability of the UE to the base station and a carrier aggregation base station that performs carrier aggregation with the base station, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

Figure 18:
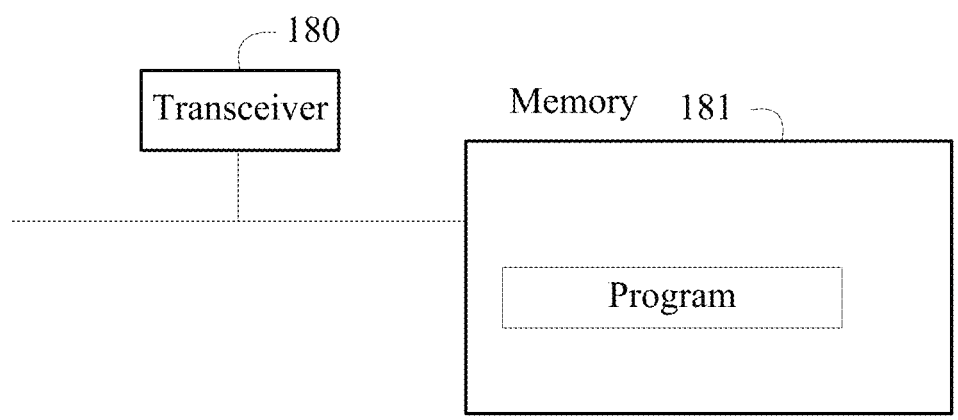
FIG. 18 is schematic diagram 2 of a base station device in a process in which multiple base stations schedule UE separately according to an embodiment of the present invention.

Referring to FIG. 18, the present invention provides a base station device, including a transceiver 180 and a memory 181.

The transceiver 180 is configured to receive data allocation information that is determined by a first base station according to a radio access capability of UE.

The memory 181 is configured to store an application program.

The transceiver 182 is further configured to invoke the application program in the memory 181 to perform the following operation: sending data to the UE according to the data allocation information, where the first base station performs carrier aggregation with the base station, and a total amount of data sent by the base stations to the UE in a TTI does not exceed a total amount of data that can be received by the UE according to the radio access capability of the UE.

The base station in the present invention may also perform actions that are performed by the second base station in the foregoing method embodiments. Receiving and sending actions performed by the second base station may be performed by the transceiver 182.

Further, the base station in the present invention may further include a processor, configured to adjust, according to HARQ feedback information or an RLC status report, a rate for sending data to the UE.

In this embodiment of the present invention, a base station receives data allocation information that is allocated by a first base station to the base station according to a radio access capability of UE and a measurement report reported by the UE and satisfies the radio access capability of the UE, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

Figure 19:
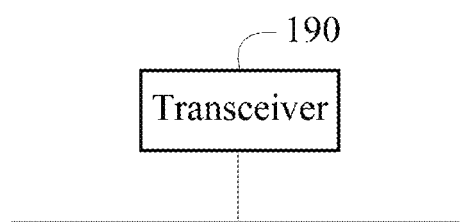
FIG. 19 is a schematic diagram of user equipment in a process in which multiple base stations schedule UE separately according to an embodiment of the present invention.

Referring to FIG. 19, the present invention provides user equipment, including a transceiver 190.

The transceiver 190 is configured to receive first data that is sent by a first base station according to first data allocation information.

The transceiver 190 is further configured to receive second data that is sent by a second base station according to second data allocation information. The first data allocation information and the second data allocation information are determined by the first base station according to a radio receiving capability of the UE, and a total amount of the first data sent by the first base station and the second data sent by the second base station that are received by the UE in a same TTI does not exceed a total amount of data that can be received by the UE according to the radio access capability of the UE.

The user equipment in the present invention may also perform actions that are performed by the user equipment in the foregoing method embodiments. Receiving and sending actions performed by the user equipment in the method embodiments may be performed by the transceiver 190.

Further, the user equipment in the present invention may further include a processor, configured to: when it is determined that an absolute value of a difference between a first data sending rate and a second data sending rate is greater than a preset threshold, notify the first base station or the second base station to adjust the data sending rate.

In this embodiment of the present invention, UE receives data allocation information that is allocated by a first base station to the first base station and a second base station according to a radio access capability of the UE and a measurement report reported by the UE, so as to coordinate numbers of downlink resources allocated to the UE by multiple base stations that participate in carrier aggregation. In this way, an amount of data sent to the UE satisfies an amount of data that can be received according to the radio access capability of the UE, thereby effectively ensuring integrity and accuracy of data received by the UE.

In conclusion, in the embodiments of the present invention, a first base station determines first data allocation information used for sending data to UE by the first base station, and determines second data allocation information used for sending data to the UE by a second base station that performs carrier aggregation with the first base station; the first base station instructs the second base station to send, according to the determined second data allocation information, data to the UE, and the first base station sends data to the UE according to the determined first data allocation information, where a total amount of data that is sent by the first base station and the second base station to the UE in a same TTI does not exceed a total amount of data that can be received according to the radio access capability of the UE. By using the technical solutions of the present invention, multiple base stations that participate in carrier aggregation can be coordinated to allocate downlink resources to UE, so that an amount of data sent to the UE satisfies a radio access capability of the UE, thereby ensuring correctness of data receiving by the UE.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communication method in carrier aggregation comprising:
    allocating, by a first base station, first and second data allocation information according to a user equipment (UE) category describing a combination of a downlink capability and an uplink capability;
    sending, by the first base station, first data to the UE according to the first data allocation information determined according to the UE category of the UE;

instructing, by the first base station, a second base station to send second data to the UE according to second data allocation information determined according to the UE category, wherein the second base station performs carrier aggregation with the first base station; and simultaneously communicating, by the first base station, with the UE and the second base station, wherein a total amount of the first data sent by the first base station and the second data sent by the second base station to the UE in a same transmission time interval (TTI) does not exceed a total amount of data that can be received by the UE according to the UE category.

2. The method in carrier aggregation according to claim 1, wherein the first data allocation information comprises a first data allocation threshold for sending the first data to the UE by the first base station; and the second data allocation information comprises a second data allocation threshold for sending the second data to the UE by the second base station.

3. The method in carrier aggregation according to claim 2, wherein each of the first and the second data allocation thresholds further comprises a multiple input multiple output (MIMO) mode used by the first base station or the second base station to send data to the UE, wherein the MIMO mode is a maximum number of supported layers for spatial multiplexing in downlink.

4. The method according to claim 2, wherein each of the first or the second data allocation thresholds comprises at least any one of the following parameters:
- a maximum number of downlink shared channel (DL-SCH) transport block bits received within the TTI;
- a maximum number of bits of the DL-SCH transport block received within the TTI;
- a total number of soft channel bits;
- a maximum number of supported layers for spatial multiplexing in downlink; and
- a maximum number of downlink packet data convergence protocol service data units within the TTL.

5. A communication method in carrier aggregation comprising:
receiving, by an apparatus user equipment (UE), first data from a first base station according to first data allocation information radio access capability; and
receiving, by the UE apparatus, second data from a second base station according to second data allocation information radio access capability;
wherein the first and the second radio access capability data allocation information are allocated by the first base station according to a UE category describing a combination of a downlink capability and an uplink capability radio access capability of user equipment (UE), and
wherein a total amount of the first and second data received from the first and second base stations, respectively, in a same transmission time interval (TTI) does not exceed a total amount of data that can be received by the UE according to the radio access capability' of the UE category.

6. The method in carrier aggregation according to claim 5, wherein the first data allocation information comprises a first data allocation threshold for sending the first data to the UE by the first base station; and the second data allocation information comprises a second data allocation threshold for sending the second data to the UE by the second base station.

7. A base station in carrier aggregation comprising:
a processor configured to allocate first and second data allocation information according to a user equipment (UE) category describing a combination of a downlink capability and an uplink capability; and
a transmitter configured to cooperate with the processor to:
send first data to the UE according to the first data allocation information determined according to the UE category; and
instruct a carrier aggregation base station to send second data to the UE according to the second data allocation information determined according to the UE category,
wherein a total amount of the first and second data sent in a same transmission time interval (TTI) does not exceed a total amount of data that can be received by the UE according to the UE category.

8. The base station in carrier aggregation according to claim 7, wherein the first data allocation information comprises a first data allocation threshold for sending the first data to the UE, and the second data allocation information comprises a second data allocation threshold for sending the second data to the UE by the carrier aggregation base station.

9. The base station in carrier aggregation according to claim 8, wherein each of the first and the second data allocation thresholds further comprises a multiple input multiple output (MIMO) mode, wherein the MIMO mode is a maximum number of supported layers for spatial multiplexing in downlink.

10. The base station according to claim 8, wherein each of the first or the second data allocation thresholds comprises at least any one of the following parameters:
- a maximum number of downlink shared channel (DL-SCH) transport block bits received within the TTI;
- a maximum number of bits of the DL-SCH transport block received within the TTI;
- a total number of soft channel bits;
- a maximum number of supported layers for spatial multiplexing in downlink; and
- a maximum number of downlink packet data convergence protocol service data units within the TTL.

11. User equipment (UE) in carrier aggregation comprising:
a processor and a receiver connected to the processor;
wherein the receiver is configured to cooperate with the processor to:
receive first data from a first base station according to a first data allocation information; and
receive second data from a second base station according to a second data allocation information,
wherein the first and the second data allocation information are allocated by the first base station according to a UE category describing a combination of a downlink capability and an uplink capability, and a total amount of the first and second data received by the UE in a same transmission time interval (TTI) does not exceed a total amount of data that can be received by the UE according to the UE category.

12. The user equipment in carrier aggregation according to claim 11, wherein the first data allocation information comprises a first data allocation threshold, and the second data allocation information comprises a second data allocation threshold.

* * * * *